(12) United States Patent
Biagiotti

(10) Patent No.: US 6,502,045 B1
(45) Date of Patent: Dec. 31, 2002

(54) UNIFIED ANALOG/DIGITAL WAVEFORM SOFTWARE ANALYSIS TOOL WITH VIDEO AND AUDIO SIGNAL ANALYSIS METHODS

(75) Inventor: William R. Biagiotti, St. James, NY (US)

(73) Assignee: ICS Systems, Inc., Hauppauge, NY (US)

( * ) Notice: Subject to any disclaimer, the term of this patent is extended or adjusted under 35 U.S.C. 154(b) by 0 days.

(21) Appl. No.: 09/575,221

(22) Filed: May 19, 2000

Related U.S. Application Data

(60) Provisional application No. 60/134,803, filed on May 19, 1999.

(51) Int. Cl.[7] .............................................. G01R 13/02
(52) U.S. Cl. ........................................ 702/66; 345/418
(58) Field of Search ............................. 702/66, 67, 68, 702/69, 70, 71, 77, 108, 109, 112, 117, 124, 126, 183, 189; 348/739; 345/418, 661, 204

(56) References Cited

U.S. PATENT DOCUMENTS

| | | | | |
|---|---|---|---|---|
| 4,598,324 A | | 7/1986 | Efron et al. ................. 358/341 |
| 4,736,447 A | | 4/1988 | Korsinsky ................... 382/69 |
| 5,065,447 A | | 11/1991 | Barnsley et al. ............. 382/56 |
| 5,404,316 A | * | 4/1995 | Klingler et al. ............. 345/418 |
| 5,634,022 A | * | 5/1997 | Crouse et al. ............... 717/130 |
| 5,655,144 A | * | 8/1997 | Milne et al. ................ 345/835 |
| 5,794,007 A | * | 8/1998 | Arrigotti et al. ............ 714/720 |
| 5,901,246 A | | 5/1999 | Hoffberg et al. ............ 382/209 |
| 5,903,261 A | * | 5/1999 | Walsh et al. ................ 345/418 |
| 5,920,340 A | * | 7/1999 | Man et al. .................. 348/181 |
| 5,991,805 A | * | 11/1999 | Krukovsky ................... 709/223 |
| 6,055,018 A | * | 4/2000 | Swan ......................... 345/447 |
| 6,069,607 A | * | 5/2000 | Everett et al. ............ 345/440.1 |
| 6,266,430 B1 | * | 7/2001 | Rhoads ....................... 382/100 |

* cited by examiner

*Primary Examiner*—Marc S. Hoff
*Assistant Examiner*—Edward Raymond
(74) *Attorney, Agent, or Firm*—Brian Roffe

(57) ABSTRACT

A unified software apparatus and method for evaluating a generic electrical signal and complex multiple-format video signals. The methods may be operated manually or programmatically and are especially intended for evaluating analog signals within an automated testing environment. The test signal data is supplied by an external source such as an external hardware digitizer or other means. This signal data may be analog or digital in nature and may comprise up to three separate channels. The apparatus generates visual aids and supporting numerical computations, resulting in concrete and tangible results, allowing analysis based upon user selected criteria such as voltage measurements, histograms, frequency domain computations, or total harmonic distortion. In addition to these methods, video waveforms may be analyzed for content based upon numerical measurements applied to a region-within-a-region concept. Within a definable "region of interest", a section of the test video signal's content may be isolated and compared to a surrounding "region of interest" to determine the accuracy of image placement and intensity.

31 Claims, 24 Drawing Sheets

FIG. 1 VSA FLOW DIAGRAM

FIG. 2 TOP LEVEL MENU STRUCTURE

FIG. 8
FIG. 9
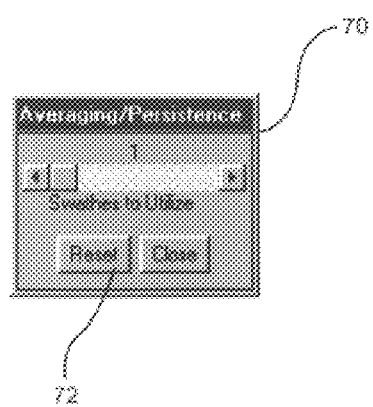
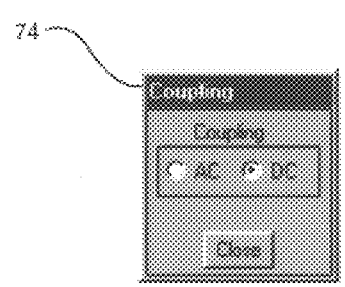

UNIFIED ANALOG/DIGITAL WAVEFORM SOFTWARE ANALYSIS TOOL WITH VIDEO AND AUDIO SIGNAL ANALYSIS METHODS

CROSS-REFERENCE TO RELATED APPLICATION

This application claims priority under 35 U.S.C. §119(e) of U.S. provisional patent application Ser. No. 60/134,803 filed May 19, 1999.

A portion of the disclosure of this patent document contains material which is subject copyright protection. The copyright owner has no objection to the facsimile reproduction by anyone of the patent document or patent disclosure as it appears in the U.S. Patent and Trademark Office patent file or records, but otherwise reserves all copyright rights whatsoever.

FIELD OF THE INVENTION

The present invention relates to the field of automatic test equipment for testing electronic signals generated by equipment under test including complex video signals. More particularly, the present invention relates to software methods (algorithms) for determining the validity of an electrical signal and software methods for analyzing the image content of generic video signals.

BACKGROUND OF THE INVENTION

Automatic test equipment for the testing and measuring of electronic signals and electronic video signals is known. Frequently, the measuring and analytical capabilities of available test instrumentation are limited to a small subset of basic analysis methods. Furthermore, the cost of building extended functionality into a hardware test unit is often very high and prohibits usage within small to mid-budgeted systems. Included within the cost of this extended functionality is often an inferior duplication of the processing and computational hardware already available within the host system (host computer).

While automatic test equipment for video signals is known, the capabilities are mainly limited to standard video format frame capture and minimal image interrogation due to the computational demand of advanced analysis. The means for visualizing complex, multiple format video images and analyzing their image content are currently beyond the capabilities of typical automatic test instrumentation.

If the analysis capabilities were separated from the hardware test instrumentation and made available as a generic software apparatus, the overall cost of such analysis would be greatly diminished and the application of other existing basic hardware test instrumentation (such as simple analog digitizers) would be increased. With the analysis functionality now residing on the host computer, it is possible to add additional facilities only available because of the capabilities of the host computer's operating system. The operator gains the ability to interactively perform complex data manipulation and receive dramatic visualization presentation of the results on the station monitor or in hardcopy form. Also important is the opportunity to automate the desired data manipulation and measurements.

OBJECTS AND SUMMARY OF THE INVENTION

It is an object of the present invention to provide a single equipment package and software analysis application capable of handling electrical signals, video signals and audio signals, each in its corresponding environment.

It is another object of the present invention to provide new automatic test equipment and methods for testing electronic signals generated by equipment under test including complex video signals.

Another object of the present invention is to provide new methods including software methods (algorithms) for determining the validity of an electrical signal.

Yet another object of the present invention is to provide new methods including software methods for analyzing the image content of generic video signals.

In order to achieve these objects and others, the invention is a virtual spectrum analyzer (listed as "VSA" henceforth) which is a computer software program intended for use with, but not limited to, automatic test equipment. The VSA performs generic software electrical signal analysis by manual interaction or by programming for autonomous operation within an automated testing environment. While analysis methods, such as histograms and FFT calculations are known, the collection of all these methods, combined with a) both manual and automated interfaces, b) enhanced interactive features, and/or c) a video analysis system featuring a "window-within-a-window" analysis method is not known.

One of the unique features that the VSA provides is the ability to appropriately handle the test waveform in its proper environment. Normal (digitized) electrical signals will be plotted and displayed much like on an oscilloscope. Digitized audio signals may be presented as audio utilizing the host computer's sound card and speakers. Digitized video signals may be reconstructed and presented optically as the original image with controls to zoom, invert and manipulate colors. Optical measurements are calculated on a unique window-within-a-window region of interest, which updates themselves automatically anytime any control is modified.

The "VSA" encompasses all the methods discussed hereinafter. The VSA comprises five major elements, as follows:

1) Graphical User Interface (listed as "GUI" hereinafter);
2) Automated Programmatic Interface ("API")/External Interface Module ("EIM");
3) Control Event Handler ("CEH");
4) Data Visualization Engine ("DVE"); and
5) Toolkit Engine ("TE").

Each of these elements will be discussed below.

A significant advantage of the VSA, while not necessarily the uniqueness of all of its components, is the combination of them and the extremely flexible methods to access them. All controls and requests are accessible from a higher level language (programmed through API calls) or directly through the GUI interface (point and click-no programming at all). This provides the ability to design and debug a test, then successfully automate it, all with the same package.

In one embodiment of the method for analyzing and testing a waveform, either an electrical signal, a digitized audio signal or a digitized video signal, a single equipment package is provided including a computer having at least a sound card, at least one speaker and a screen. As noted above, the VSA provides the ability to analyze each waveform in its proper environment. Thus, when the waveform is an electrical signal, a swath of the electrical signal is plotted and displayed on the screen. When the waveform is a digitized audio signal, the audio signal is passed to the sound card and speaker, which convert it to sound. When the waveform is a digitized video signal, the video signal is reconstructed on the screen. Software tools are provided operative on the electrical signal, the audio signal and the video signal to effect changes in the electrical signal, the audio signal and the video signal. When the waveform is the electrical signal or video signal, the changed signal is displayed on the screen. When the waveform is the audio signal, the changed audio signal is directed to the sound card and speaker, the changed signal is thereby heard.

The tools may be controlled via a user interface to enable manual adjustment of the waveform or from a command log generated through programming to perform desired control of the tools. In the latter case, the command log is operatively accessed to obtain the desired control commands for the tools such that automatic adjustment of the waveform via the tools is accomplished.

When the waveform is an electrical signal or a video signal, operability of the tools can be limited to only a selected portion of the electrical signal or video signal on the screen. This selected portion can be displayed in a different area of the screen. By linking the portion of the signal and the entire signal, changes to one will appear on the other.

In another embodiment of the method for performing electrical signal analysis, at least one test signal, e.g., a video signal, is displayed, both manual and automatic manipulation of the test signal(s) is enabled and the manipulated test signal(s) is/are displayed. Data from the manipulation of each test signal may be obtained. The test signals may be obtained by digitizing electronic analog signals from an instrument and optionally storing the digitized signals in a binary file. In the alternative, the test signal(s) may be obtained in a binary file with decimal values, or a single capture of waveform data performed to obtain the test signal therefrom. If multiple captures of waveform data are performed, the captured data may be arranged as a two-dimensional matrix which constitutes the test signal. Additional information about the test signal may be encoded. If the test signal comprises three test signals, all three of the test signals can be displayed on a single screen.

To enable manual and automatic manipulation of the test signal, available options are presented on a screen, and manual selection and adjustment of the available options are enabled through a user interface, e.g., a keyboard or mouse. The available options include plotting options such as time domain plotting, FFT results, spectrum/magnitude plotting, autocorrelation plotting and cross correlation plotting. Also, configuration adjustment options include orientation adjustment of a graph of the test signal, color adjustments, test adjustments, highlighting, and axis scale lock adjustments. Signal manipulation options include filters, a ranking of peaks in the test signal by amplitude, averaging, fixed voltage removal, and addition and subtraction of an additional test signal to the test signal. One or more discrete portions of the test signal may be selected for manipulation, e.g., by determining a boundary of the test signal to define the selected portion, and displaying the selected portion of the test signal in a different area of the same screen as the test signal is being displayed. This enables only the selected portion of the test signal to be manipulated and/or compared to a surrounding portion of the test signal.

In another embodiment, to enable manual and automatic manipulation of the test signal, available options for manipulation of the test signal are created and a library of stored subroutines provided in a memory space to perform the options such that the test signal is able to be manipulated by the running of the subroutines. In this connection, a computer may be programmed to receive the test signal, perform at least one of the subroutines to manipulate the test signal and display the manipulated test signal.

A plot tracking option is also provided and is useful when a portion of the test signal is displayed separate from the display of the entire at least one test signal, although they may both be on the same screen. One or more signal modification techniques are applied either to the portion of the test signal or the entire test signal, and by linking the display of the entire test signal to the display of the portion of the test signal, the application of the signal modification technique(s) to the portion of the test signal or the entire test signal is reflected in the display of the other.

BRIEF DESCRIPTION OF THE DRAWINGS

A more complete appreciation of the present invention and many of the attendant advantages thereof will be readily understood by reference to the following detailed description of the invention when considered in connection with the accompanying drawings in which:

FIGS. 7–12 show toolkits providing various test signal manipulation functions for the invention;

DETAILED DESCRIPTION OF THE PREFERRED EMBODIMENTS

Figure 1:
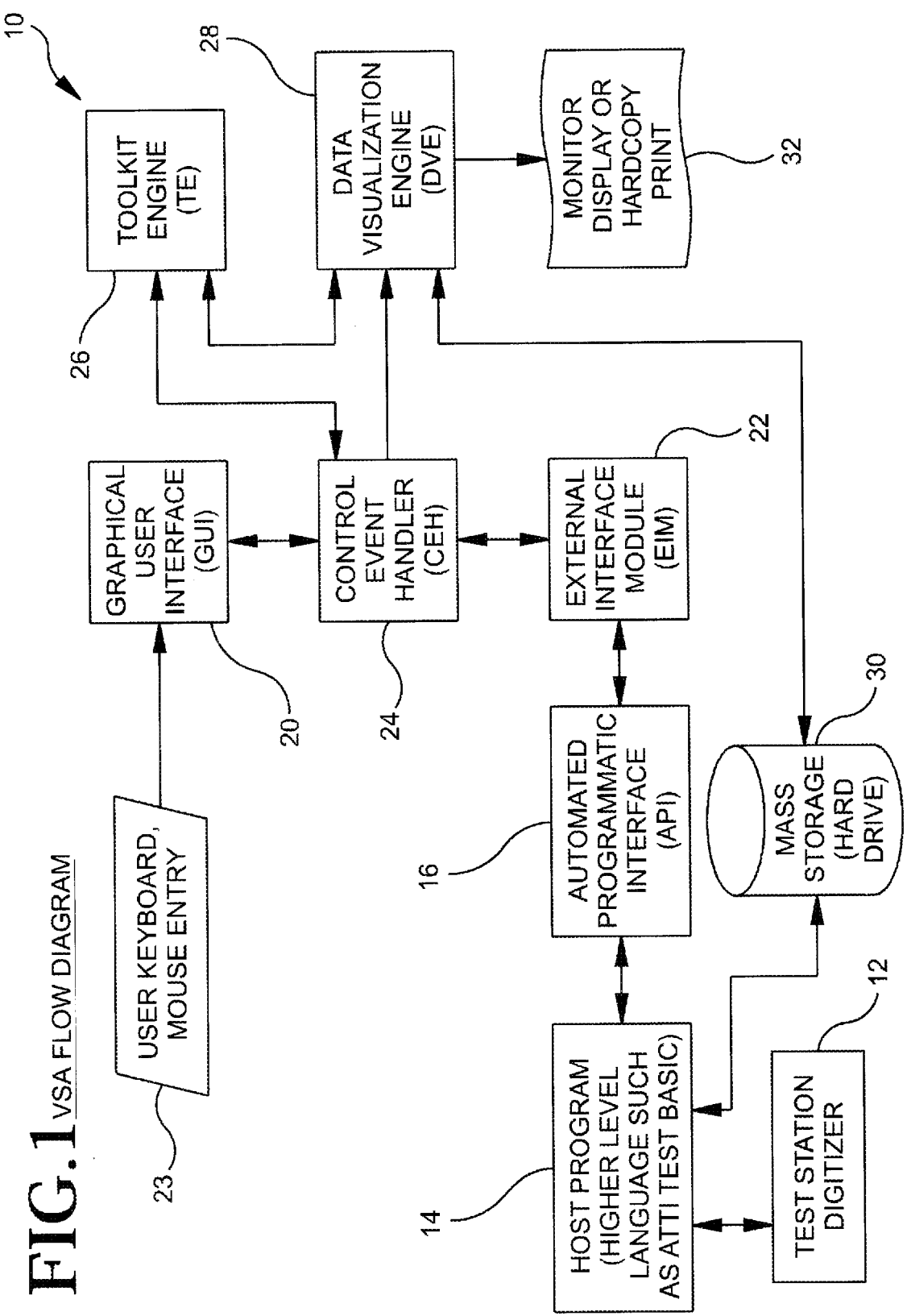
FIG. 1 is a flow chart of the VSA in accordance with the invention.

Referring to the accompanying drawings wherein like reference numerals refer to the same or similar elements throughout the several views. a flow diagram of the VSA is shown in FIG. 1 and the VSA is generally designated as 10. The basic software of the present invention is shown in detail in the program listing of the Appendix hereto. Electronic analog signals are digitized by any external instrument (represented by box 12) under the control of a host program 14 (a higher level programming language such as Test Basic™), and stored in a compact binary file on any suitable storage media. Optionally, instead of using digitized values, the binary file may be constructed with actual decimal (i.e., voltage) values, facilitating a simulation of test signals without requiring the presence of test station assets. The automated programmable/programmatic interface (API) 16 supplies the necessary subroutines for constructing the data file in such a way that the VSA 10 may interpret. The data may consist of a single capture of waveform data or multiple captures arranged as a two dimensional matrix. The API 16 also encodes other information about the data, such as bits of resolution, voltage offset, and peak-to-peak voltage for digital data. All forms of data will usually encode the sampling clock frequency, number of data swathes, the number of samples in each data swath, optional names for each swath and a title.

There are two command input channels for the VSA 10, namely the graphical user interface ("GUI") 20 and the external interface module 22 ("EIM") operating in conjunction with the automated programmable interface 16 (API). The GUI element 20 embodies the manual interface 24 to the VSA 10, e.g., a keyboard or other data entry device, or mouse or the like. The GUI 20 comprises a visual presentation to the operator allowing complete interactive access to all controls. The primary "viewing window" contains the currently selected data plot with controls to adjust the starting and ending data sample number (affecting a "zoom function"). An alternate method of selecting the data starting and ending point is to right-click (to select the ending point) or left-click (to select the starting point) the mouse buttons directly on the plot window. The right side of the main "window" contains a control to select which data swath from the data file, to plot. If swath names have been programmed in the data file, an alternative selection method is available by selecting the swath name from a drop list menu. The menu bar along the top of the "window" contains access to other control sections of the VSA 10.

Referring now to FIGS. 2–13, FIG. 2 contains a non-limiting layout of the menu bar controls. The controls are as follows:

1) Plot Type, including time domain plotting, FFT results, spectrum and auto correlation plotting and cross correlation plotting (as represented by box 42 in FIG. 2);
2) Configuration (shown in FIG. 6), including swath orientation, miscellaneous adjustment options, a default control and a TriGraph™ mode selection (i.e., the ability to plot three different data swathes on three discrete plots (FIG. 5);
3) Toolkit selection controls (box 40) including a windowing toolkit, a marker toolkit, an averaging/persistence toolkit, a coupling toolkit, a prefilter toolkit, a multiple signal toolkit, a visual imaging toolkit, an error bounds toolkit, an audio signal toolkit, a waveform measurements toolkit and a linearity measurements toolkit;
4) Miscellaneous controls (box 38);
5) Master Reset control 36 which resets all VSA controls to their default settings; and
6) Terminate control 34 which ends VSA execution.

Figure 2:
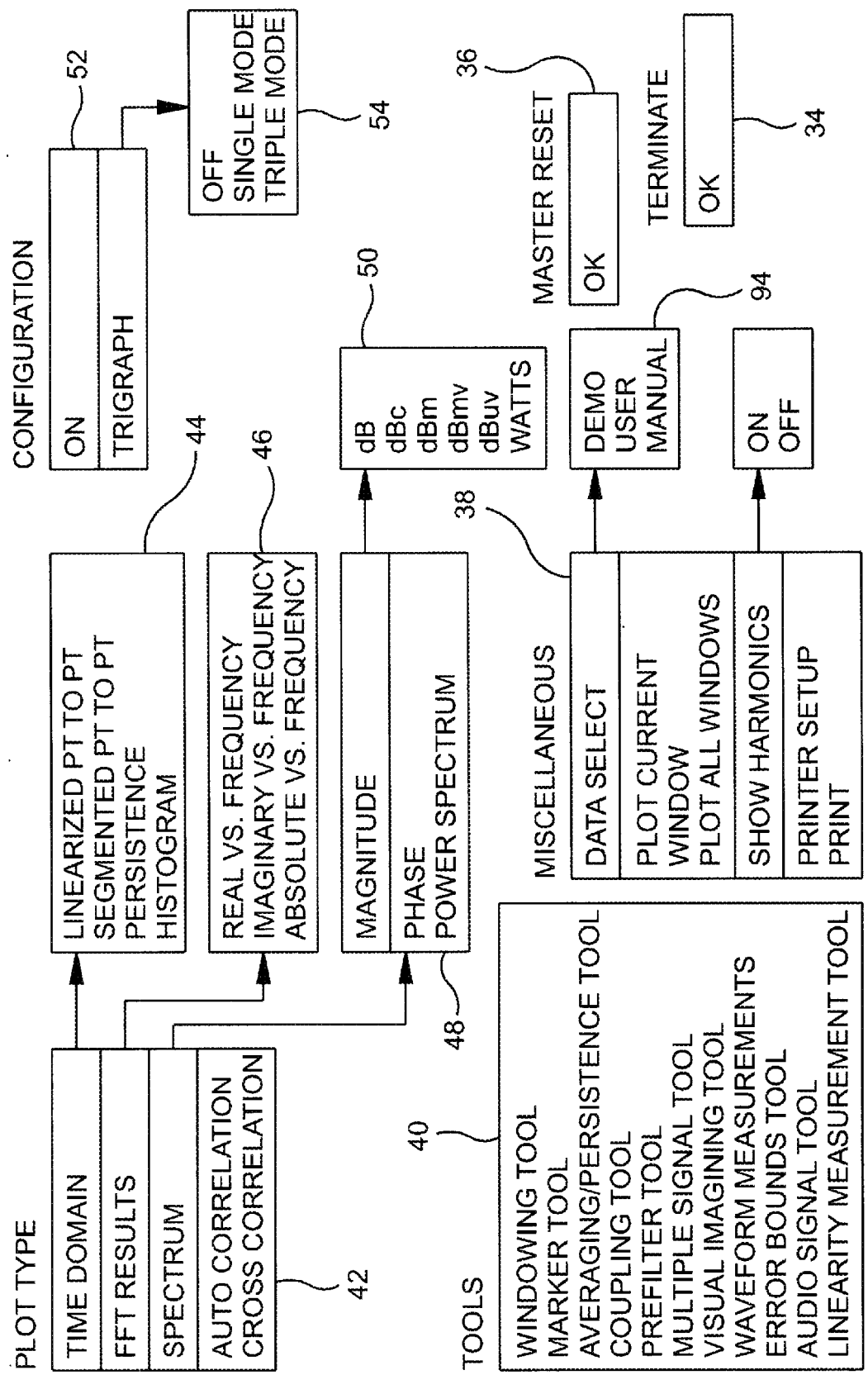
FIG. 2 shows an exemplifying top level menu control bar for use in the invention.
Figure 3:
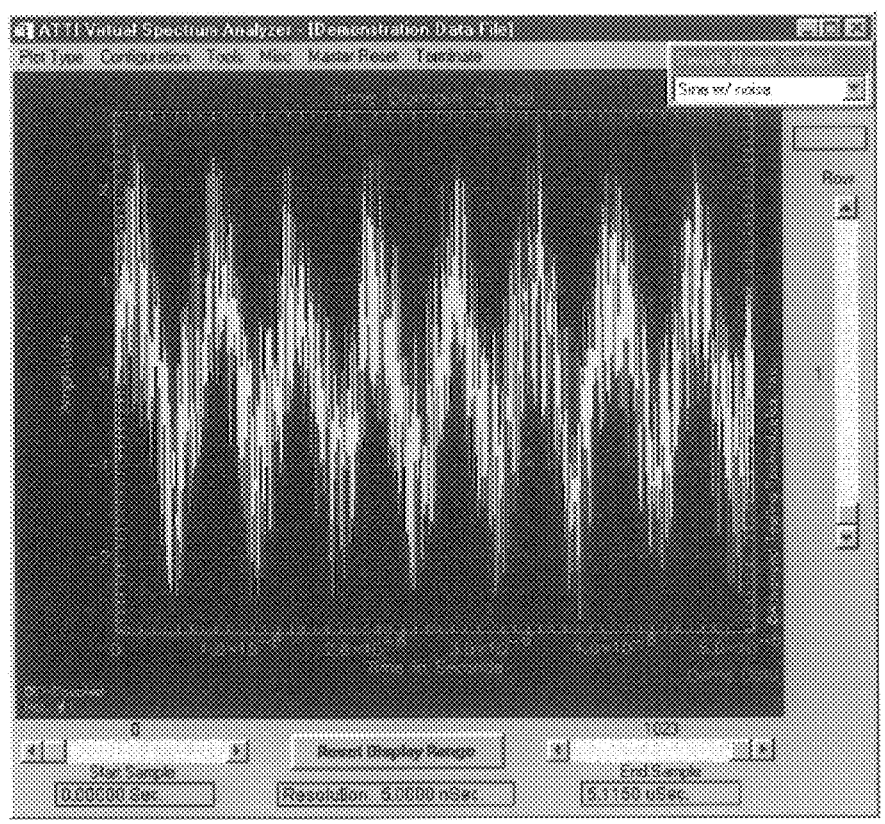
FIG. 3 shows a test signal in an interpolated plot mode.
Figure 4:
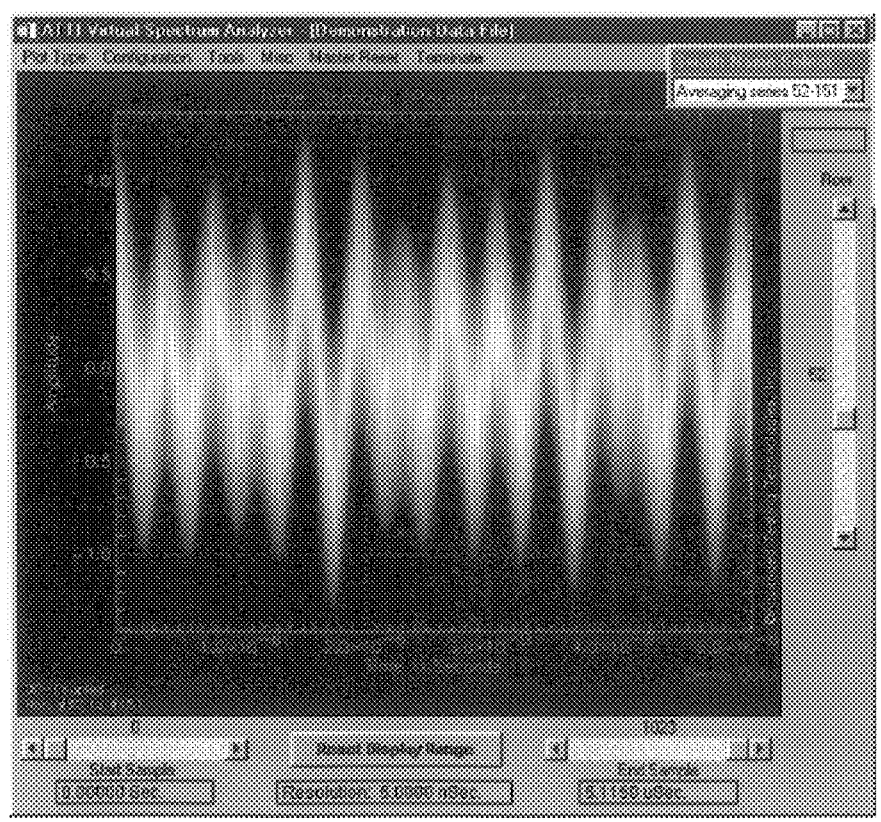
FIG. 4 shows a test signal in a persistence plot mode.

With respect to the plot type controls 42, time domain plotting is a collection of four (4) time vs. amplitude plot modes consisting of interpolated plotting (FIG. 3), segmented plotting, persistence plotting (FIG. 4) and histogram plotting (as represented by box 44 in FIG. 2). Analog persistence is known in hardware oscilloscope units, but is not known in software apparatus. Analog persistence is a means of depicting analog history events in varying colors or intensities in order to differentiate between spurious and normal (repetitive) signals. The VSA 10 simulates analog persistence by successively overplotting sequential data plots into a software Z-buffer and accumulating counts for every possible point on the plotting grid. After all values have been tabulated, binary color values (from 0 to 255) are assigned with higher values going to those points with higher weighting. These color values point into a calculated color palette which is adjusted for optimum viewing according to the number of discrete colors in each persistence plot. The entire image is read from the Z-buffer and copied into the main display window and overlaid with plot axes.

The FFT results (as represented by box at 46 in FIG. 2) are three plot modes, namely real values vs. frequency, imaginary values vs. frequency, absolute values vs. frequency. The spectrum controls (as represented by box 48 in FIG. 2) include magnitude plotting (in units of dB, dBc, dBm, dBmv, dBuv or watts-box 50), phase angle plotting (angle vs. frequency), or power spectrum plotting.

Figure 5:
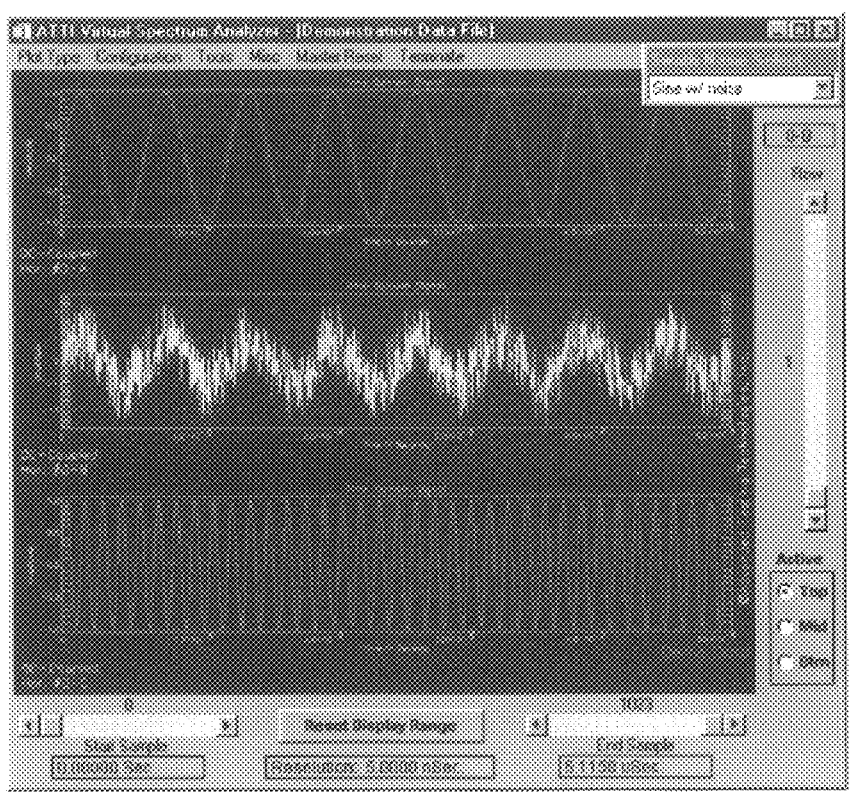
FIG. 5 shows a test signal in a TriGraph™ plot mode.
Figure 6:
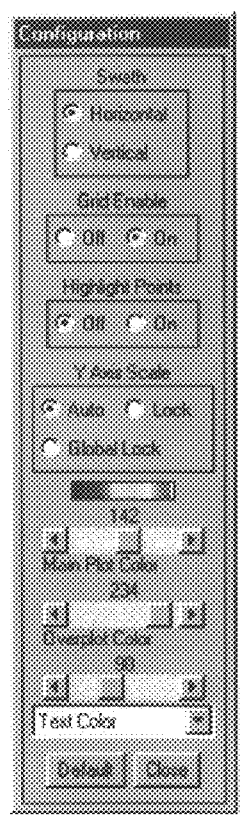
FIG. 6 shows available configuration options for use in the invention.

The auto correlation plotting provides a test of waveform periodicity while the cross correlation plotting provides a test of one waveform's conformity to another in terms of correlation factor vs. lag. With respect to the configuration controls, as represented by box 52 in FIG. 2 and shown in FIG. 6, options include swath orientation which enables the selection of an axis in which to view the matrix data (horizontally or vertically) and miscellaneous plot adjustments such grid enable, point highlighting, Y axis scale lock, color adjustments for plot color, overplot color, text color and background color. Further, the configuration controls includes a default control to reset all configuration values to original values and a TriGraph™ mode selection (as represented by box 52 in FIG. 2). As noted above, TriGraph™ modes select the ability to plot three different data swathes on three discrete plots as shown in FIG. 5. TriGraph™ single mode plots three sequential data swathes in single increments suitable for examining data progressions. TriGraph™ triplet mode plots three sequential data swathes in increments of three suitable for displaying data with three discrete channels such as RGB video.

With respect to the toolkit selection controls (as represented by box 40 in FIG. 2), such controls include a windowing toolkit 58 (FIG. 7) which provides Hanning, Hamming, KaiserBessel, Blackman, Bartlett, Cosine-raised-to-the-Nth and Sine-raised-to-the-Nth windows 60 to be applied to frequency domain plots to help eliminate FFT artifacts. Hanning, KaiserBessel, Bartlett, Cosine and Sine filters are supplied with adjustment controls 62. Other means for eliminating FFT artifacts and cosine and sine filters may also be used in the invention. A default button 64 allows the original values to be applied to all controls. A marker toolkit (FIG. 11) enables the VSA voltage peak analyzer which detects all signal peaks within a data swath and ranks them by amplitude. Initially, two visual markers are placed on the plotted data, one at the most positive peak, and the other at the most negative peak. A series of 12 buttons (66), including two manual placement modes, select the movement of the markers. As the markers are moved within the plot window, the X and Y axis values, corresponding to the marker's placement, are displayed within the Marker Toolkit. A reset/default button 68 allows the original values to be applied to all controls An averaging/persistence toolkit 70 (FIG. 8) serves a dual purpose. If the "persistence" mode has not been selected, a value of over '1' will place the VSA 10 into an averaging mode. The next "n−1" swathes will be averaged with the current swath and plotted. In the "persistence" mode, the next "n−1" swathes will be "persisted" with the current swath and plotted. A default button 72 allow the original value to be applied to the control.

A coupling toolkit 74 (FIG. 9) enables a selection of AC (alternating current) or DC (direct current) voltage and if DC is selected calculates the removal of any DC offset voltage from the data swathes.

A prefilter toolkit 76 (FIG. 10) allows frequency domain filtering to be performed on the data swathes. A frequency-based filter mode or an amplitude-based filter mode may be selected. Selectable frequency-based filter modes 78 are low pass, high pass, band pass and band reject. Adjustable controls 80 adjust the filter frequency cutoff values to be applied to the current data swath. The amplitude-based filter has a selectable automatic or manual threshold setting 82. Waveform components above or below the threshold may be filtered out (box 84) by appropriate filters.

A multiple signal toolkit 86 (FIG. 12) allows swath-addition, subtraction and overplotting to be performed on the current set of axes. A secondary swath selection control specifies which data swath is to be utilized with these functions. By embedding a reference signal into the data matrix, swath mathematics can be used to assist an automated pass/fail criteria when used in conjunction with the other toolkits. The end result of this comparison may be determined visually by examining the plotted data or by returning waveform values and/or measurements through the API 16. The functions supported by the multiple signal toolkit 86 are: 1) swath addition (data=swath A+swath B); 2) swath subtraction (data=swath A−swath B); 3) reverse swath subtraction (data=swath B−swath A); 4) swath overplotting (data=swath A and swath B); and 5) swath (unaltered or original) overplotting (data=swath A and swath B (original)).

The visual imaging toolkit 88 (FIG. 13) is discussed below.

Another means for creating an automated pass/fail criteria is the error bounds toolkit. This toolkit provides the ability to create several sets of upper and lower error bounds templates (up to three (3) in a preferred embodiment) which the present waveform(s) is/are compared to. Data points which fall into the error bounds are counted and a passing percentile, and/or other statistics, is/are calculated. The results may also be presented visually by painting the error bounds over the current waveform and marking all out-of-range data with symbology. Error bounds may be created automatically from a known good data swath or programmatically supplied by the user through the use of create and append commands.

For data swaths that pertain to digitized audio signals, visualization and mathematical analysis do not always provide the necessary criteria for signal validation. The audio signal toolkit provides the ability to "play" audio data via the host computer's sound card and speakers and re-create the original sound for confirmation by the test operator. Integrating the audio signal toolkit with the other toolkits mentioned herein allows the use of the other toolkits to manipulate or enhance the audio data. For example, the prefilter toolkit may be used to eliminate undesired audio frequencies or background noise. Controls are provided for altering the playback frequency of the signal, playback repeat for extending the duration of the audio and means for exporting the data in a common "wav"-type file format. For audio template use, the ability is provided to load and play external "wav"-type files.

The waveform measurements toolkit automatically calculates and displays a series of approximately fifteen (15) time domain and frequency domain measurements including frequency, period, average voltage, peak voltage, rms voltage, and total harmonic distortion.

Automatic linearity measurements may be selected for data swathes that contain cyclical ramps and ramp-like waveforms. This measurement mode operates by automatically detecting the start and end of data slope segments. No each slope, the data between user-specified percentile thresholds is examined and a straight (linear) line is fitted to that data. The measurement results available consist of the slope of the fitted line, the Y-axis intercept, correlation coefficient, maximum positive deviation and maximum negative deviation.

As shown in FIG. 2, the miscellaneous controls 38 include a data select control which permits the selection of waveform data from one of three sources shown in box 94. The first source is a demonstration data set that is supplied with the VSA. The second source is the user data file (constructed by the API 16) and the third source is a manual entry dialog which queries the operator to select the desired file.

Other controls are a plot current window control which plots the currently selected window and its configuration (selected from the windowing toolkit 58), a plot all windows control which plots all windows simultaneously with their current configurations, a show harmonics control which highlights the first 10 harmonics on frequency domain plots which are used in the calculation of total harmonic distortion, an XY data table to view discrete values, and a printer setup control which launches a manual entry dialog allowing the operator to alter or modify the currently selected printer device. Another control is the print control which prints a copy of the currently displayed plot with additional nomenclature detailing current control settings.

The external interface module 22 operating in conjunction with the automated programmatic interface 16 embody the programmatic interface to the VSA. Every control discussed in the GUI 20 section is available to a higher level language, such as Advanced Testing Technology Inc.'s (the current assignee) Test Basic™. The API 16 is a library of subroutines that package the operator waveform data and commands and sends them to the VSA 10 where they are received by the EIM 22. Additional commands are also supplied to supplant the automatic operation. These commands are a) Data request functions-any data calculated or displayed within the VSA 10 is retrievable through an API subroutine, including plotted XY data points from any mode, all peak data from the marker toolkit and all measurements from the waveform measurement toolkit and the visual imaging toolkit;

b) Visual window control and presentation-controls that enhance the dynamic presentation of the VSA 10;

b-1) a first control which allows the programmer to iconize or windowize the VSA 10 depending upon whether the VSA visual presentation is desired or only the computations are of interest;

b-2) a second control which allows the programmer to set the time interval between execution of VSA commands providing the ability to create a visual slideshow or demonstration;

b-3) a third control which allows the programmer to temporarily pass control of the VSA 10 to the operator by pausing command execution and waiting for the operator to restart the execution (desirable if manual inputs or selections are required);

b-4) a fourth control allows the programmer to display informational text across the face of the VSA plotting window.

All operator commands captured by the GUI 20 or the API/EIM 16/22 are sent to the control event handler 24 (CEH) for decoding and processing. The CEH 24 comprises three decoding structures, one for the menu bar command selection decoding, one for the toolkit command decoding and one for API-only command decoding. The decoding structures are s constructed around a simple English-like command set which facilitates CEH usage by modules other than the GUI 20. Once the current command has been recognized and parsed by the decoders, it is either operated on within the CEH 24, passed to the toolkit engine 26 (TE) or else to underlying supporting routines. A typical event would be to adjust a control within a toolkit. In addition to modifying the control parameter (such as the plotting color), the corresponding GUI 20 control is adjusted to reflect the new command setting.

The toolkit engine 26 is a collection of routines dedicated to the processing of the toolkit functions as discussed previously with reference to FIGS. 6–12. The routines of the TE 26 may be called from the control event handler 24 or directly from the data visualization engine 28.

The last element in the event processing sequence is the data visualization engine 28 (DVE). DVE 28 is implemented in connection with a mass storage device 30 such as hard drive, which storage device 30 is used for implementation of the host program 14. The DVE 28 is responsible for 1) retrieving the selected data swath from the data file, 2) considering all present command selections and resolving any unfulfilled requests, 3) calculating the visual data necessary to display the requested plot image, and 4) updating the image displayed on the monitor with additional nomenclature detailing control settings. The image displayed on the monitor 32 may also be forwarded to a printer for creation of a hard copy or to a file storage device for storage.

Referring again to FIG. 13, the visual imaging toolkit 88 is primarily targeted for 1) diagnosing video image generator operation by examining for correct placement (or existence) of image features within a video signal, 2) diagnosing video amplifier problems/failures by measuring the accuracy of image intensity and related amplitude characteristics, and 3) resolving fault detection to the video generating UUT (unit under test) or the video display UUT.

Visual imaging toolkit 88 embodies al wide range of visual enhancement functions and measurements facilitating the automated analysis of digitized video signals. The VSA 10 is capable of operating on a wide spectrum of video formats such as composite video (black & white and RGB color), stroke deflection video (point-to-point XYZ), raster video (unmodulated and modulated) and digital video. One of the primary functions of toolkit 88 is the reconstruction and display of the video image for visual analysis. The VSA 10 extracts minimum and maximum intensity level information from the data file and scales this range into a 24 bit intensity scale compatible with common computer graphical hardware. For video formats with X and Y axis deflections specified, each "pixel" is location quantized onto a 1024 by 1024 element grid. The calculated display is normalized (enlarged or reduced by an decimal factor) and displayed in the primary display window. A secondary window displays a subset of the image governed by a 'zoom factor' control and cursor placement over the primary window.

The core of the visual imaging toolkit's 88 video measurement system is the ability to manually or programmatically define a two stage region of interest (window-within-a-window). By isolating portions of the image for selective measurement analysis, image feature analysis and recognition is possible. The region of interest (ROI) is defined by either a manual click-and-drag operation with the mouse or with 'slider' controls. The inside ROI is defined by selecting coordinates for all four sides. The outside ROI is defined with an X and Y axis offset from the inside ROI coordinates. Integrated with the ROI is the measurement mode selection and the color threshold controls. Each color plane has a discrete set of measurement display windows and threshold controls. There are four (4) measurement display windows per color plane which display the following information: 1) pixel values outside the threshold range over the entire display; 2) pixel values inside the threshold range over entire display; 3) placement within the inside ROI; and 4) placement within the outside ROI #2 exclusively. There are two (2) threshold controls per color plane: 1) the upper threshold control; and 2) the lower threshold control. There are thirteen (13) measurement modes: 1) threshold counts; 2) threshold counts (%); 3) average pixel value; 4) highest pixel value; 5) lowest pixel value; 6) strongest pixel weight; 7) weakest pixel weight; 8) median pixel value; 9) unique level count; 10) contrast; 11) standard deviation; 12) mean absolute deviation; and 13) variance. As any one of the above controls is adjusted, the values within the measurement display windows are updated. For example, if measurement mode 3 (average pixel value) is selected, display window #1 would contain the average pixel value outside of the threshold range over the entire display. Similarly, display window #2 would contain the average pixel value inside the threshold range over the entire display. Display window #3 would contain the average pixel value existing only within the inner ROI and display window #4 would contain the average value existing exclusively within the outer ROI.

Figure 13:
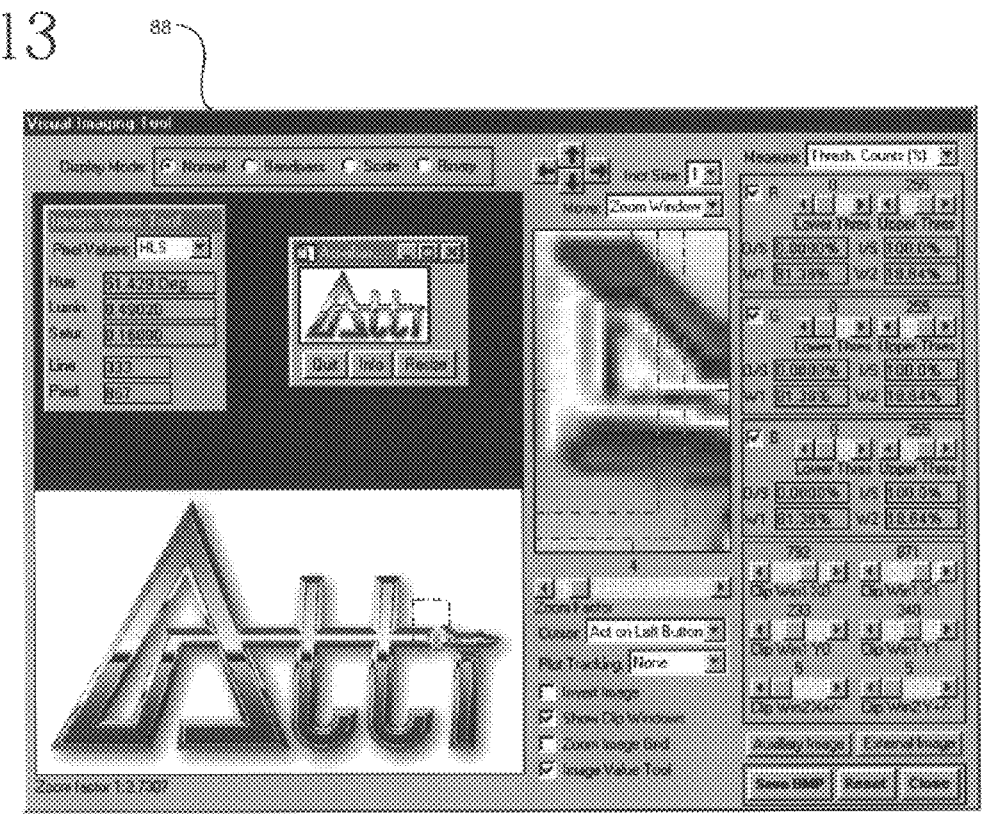
FIG. 13 shows a visual imaging toolkit for providing test signal manipulation functions and with an auxiliary viewer, i.e., the window-in-a-window feature in accordance with the invention.

Within the visual imaging toolkit 88 is the image value toolkit 96 (FIG. 13). The image value toolkit 96 provides a constant update of the pixel values and XY location values at the current cursor (mouse) position. Pixel values are available as analog voltages, 24 bit binary equivalents, a percentage of full scale hue/luminance/saturation, or hue/saturation/value. This toolkit 96 works with the cursor positioned over the primary image window or the secondary image window.

The plot tracking option provides the ability to link the video waveform plot display (FIG. 5) to the current cursor position of the mouse within the primary image widow (FIG. 13). As the cursor is moved across the primary image window (FIG. 13), the waveform plot window (FIG. 5) is dynamically updated to reflect the current video line position. The waveform plot window may be programmed to display the entire video line or the portion of the video line displayed within the secondary (zoom) image window. All controls enables via the waveform toolkits will operate on each waveform update. By linking the display of the video line (or other test signal) to the display of the selected portion of the video line, the application of the signal modification technique(s) to the selected portion of the video line or the entire video line is reflected in the display of the other.

The manual aspects of the visual imaging toolkit 88 will now be detailed. As shown at the top of the screen shown in FIG. 13, there are four selectable display modes: 'normal', 'band pass', 'scale', and 'binary'. The 'band pass' mode adjusts the image to display only the intensities selected by the threshold controls on each color plane. Intensities outside of the threshold range are displayed as minimum intensity or 'black'. The effect of the 'band pass' filter is to enhance image recognition by masking out unnecessary intensities or colors. The 'binary' mode (enhances image recognition) adjusts the image to display the intensities selected by the threshold controls is to full 'on' and all others to full 'off'. The effect of the 'binary' mode is to enhance image recognition by compressing intensity variations into a simple black and white-like image. 'Binary' mode is similar to 'band pass' except that the selected threshold values are altered to maximum intensity ('white'). The 'scale' mode (enhances image contrast) adjusts the image by taking the range of intensities selected by the threshold controls and expanding that to the entire range. Normal mode is self-explanatory. In addition to the four basic display modes, an image inversion mode is simultaneously available.

For visual comparison testing criteria, there are up to ten auxiliary viewers available. The auxiliary viewers are used to display a resizable copy of the present image or display a comparison/template image stored in an external BMP file. Pass/failure determination will be made solely by the operator.

The operation of the VSA 10 will now be described with reference to FIGS. 14–27.

Figure 14:
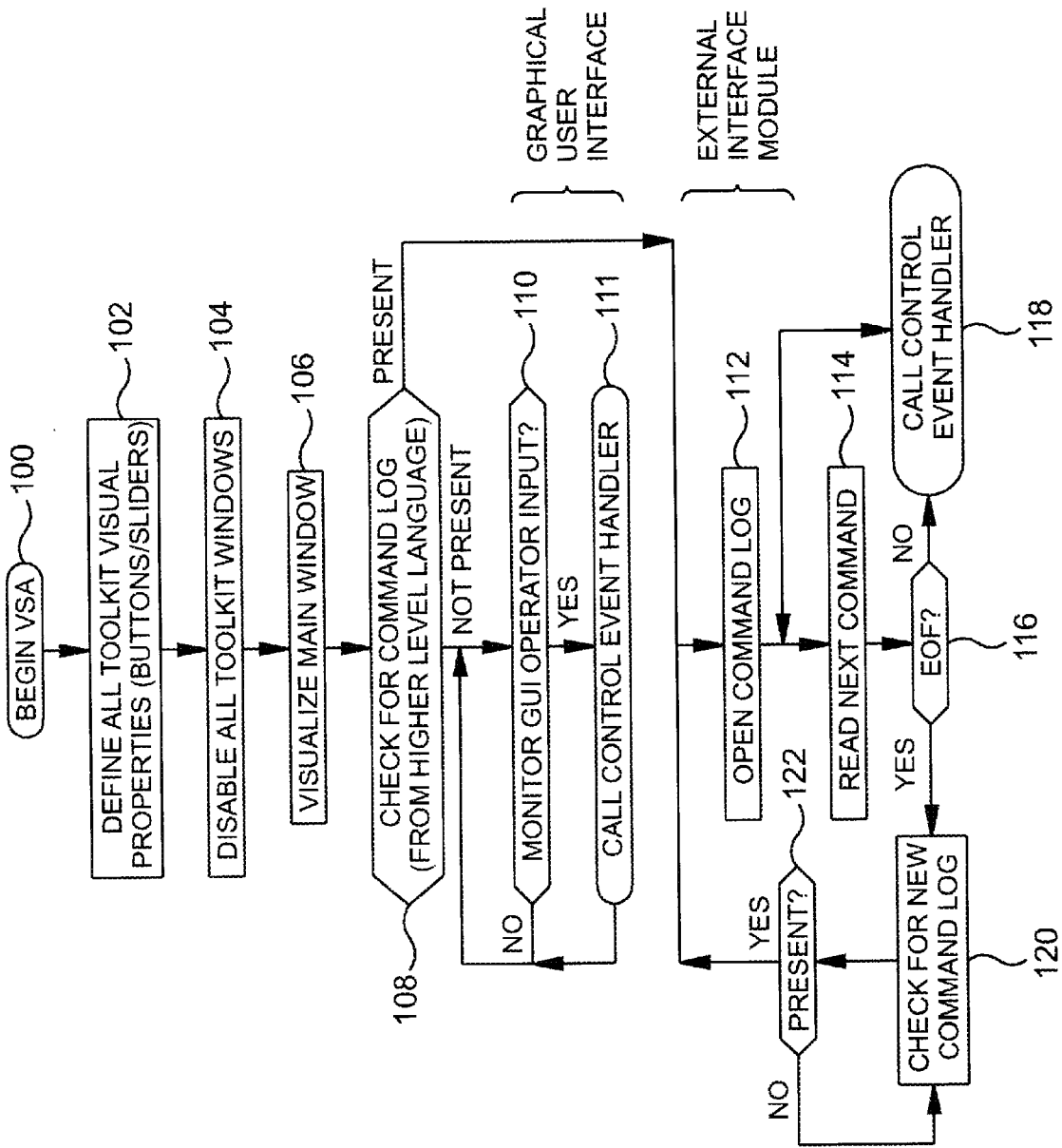
FIG. 14 shows a sample flow chart for the initialization of the VSA in accordance with the invention.

Starting in FIG. 14, the VSA 10 is begun at box 100. The first step (at 102) is to define all toolkit visual properties, e.g., by adjusting buttons and sliders to provide for the desired properties. This adjustment may be done, e.g., using a mouse. All toolkit windows are disabled at 104 and the main window is visualized at 106. A determination is made as to whether a command log is present at 108, from a higher level language, and if not, input from the GUI element 20 is monitored at 110. The GUI 20u may be a keyboard or other data entry device as discussed above. If the GUI 20 is activated, the control event handler (CEH) 24 is called at 111 and the process continues. If not, monitoring of the GUI 20 continues until the user provides some input. If a command log is present, the command log is opened at 112, the next command is read at 114. A determination is made if the end of the file has been reached at 116. If not, i.e., there is at least one remaining command, the CEH 24 is called at 118. If the end of the file has been reached and there are no remaining commands, a check for a new command is made at 120. Once a new command log is present at 122, the new command log is opened and the processes continues at 112.

Figure 15:
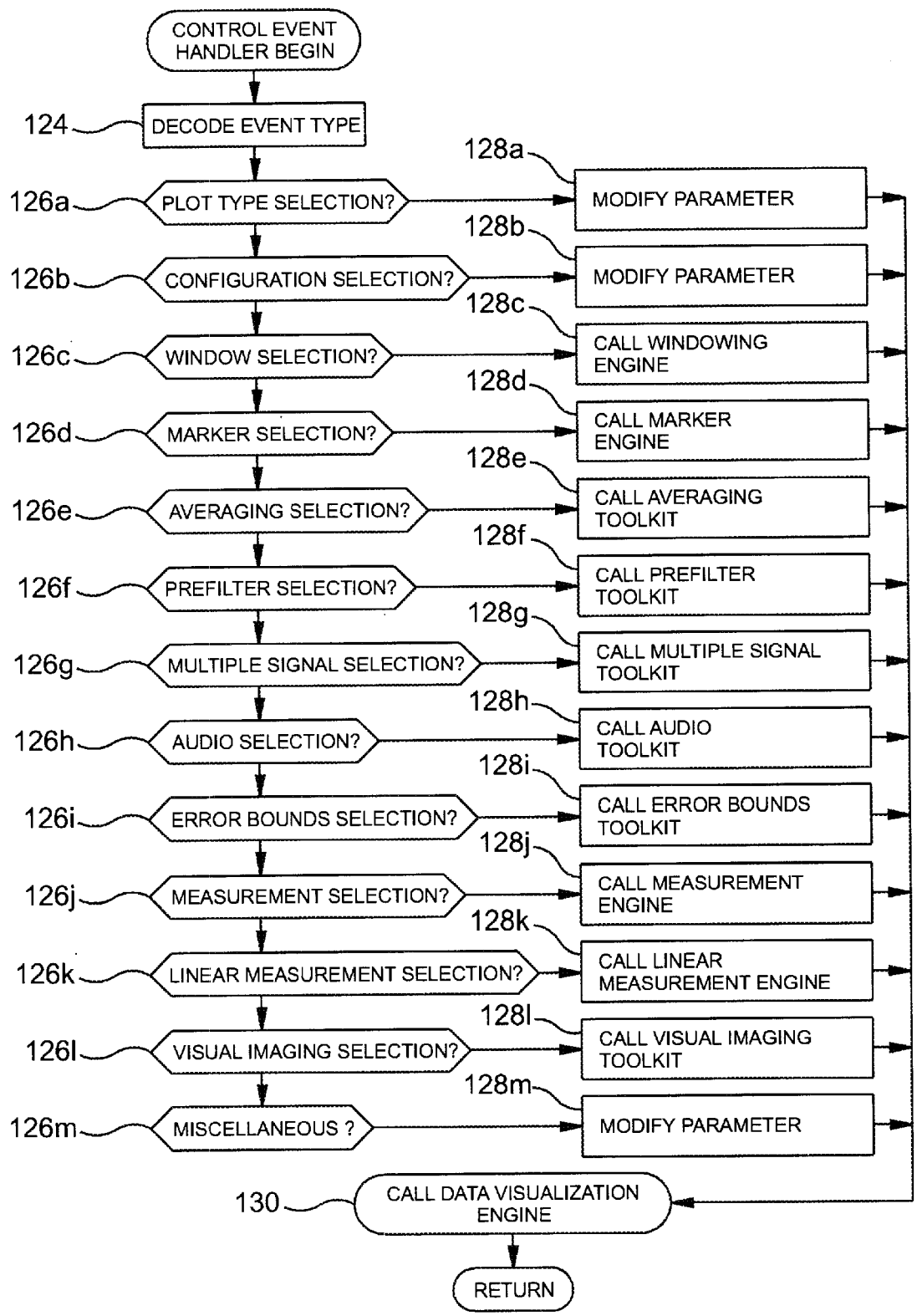
FIG. 15 shows a sample flow chart for operation of the control event handler in accordance with the invention.
Figure 16:
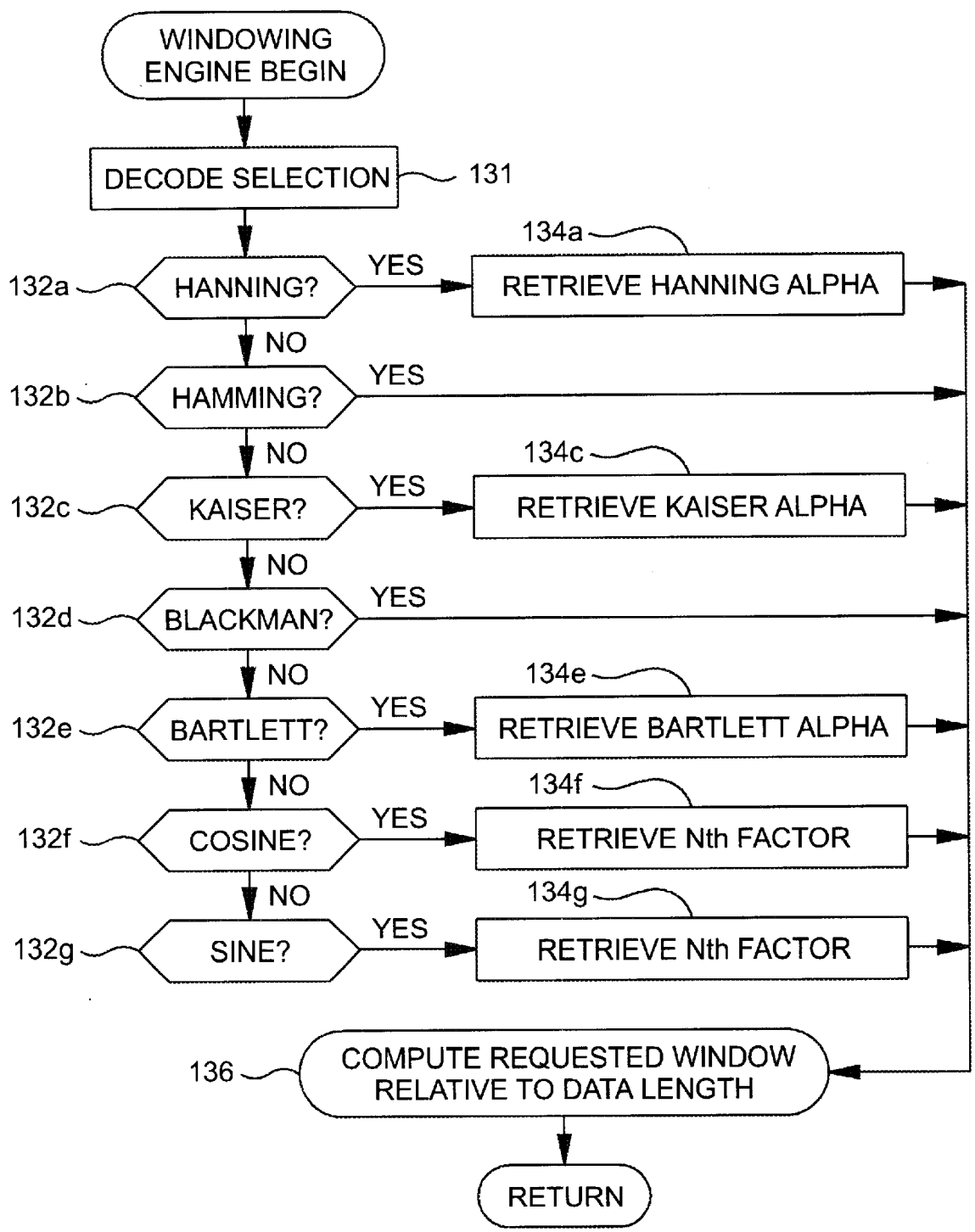
FIG. 16 shows a sample flow chart for operation of the windowing toolkit in accordance with the invention.
Figure 17:
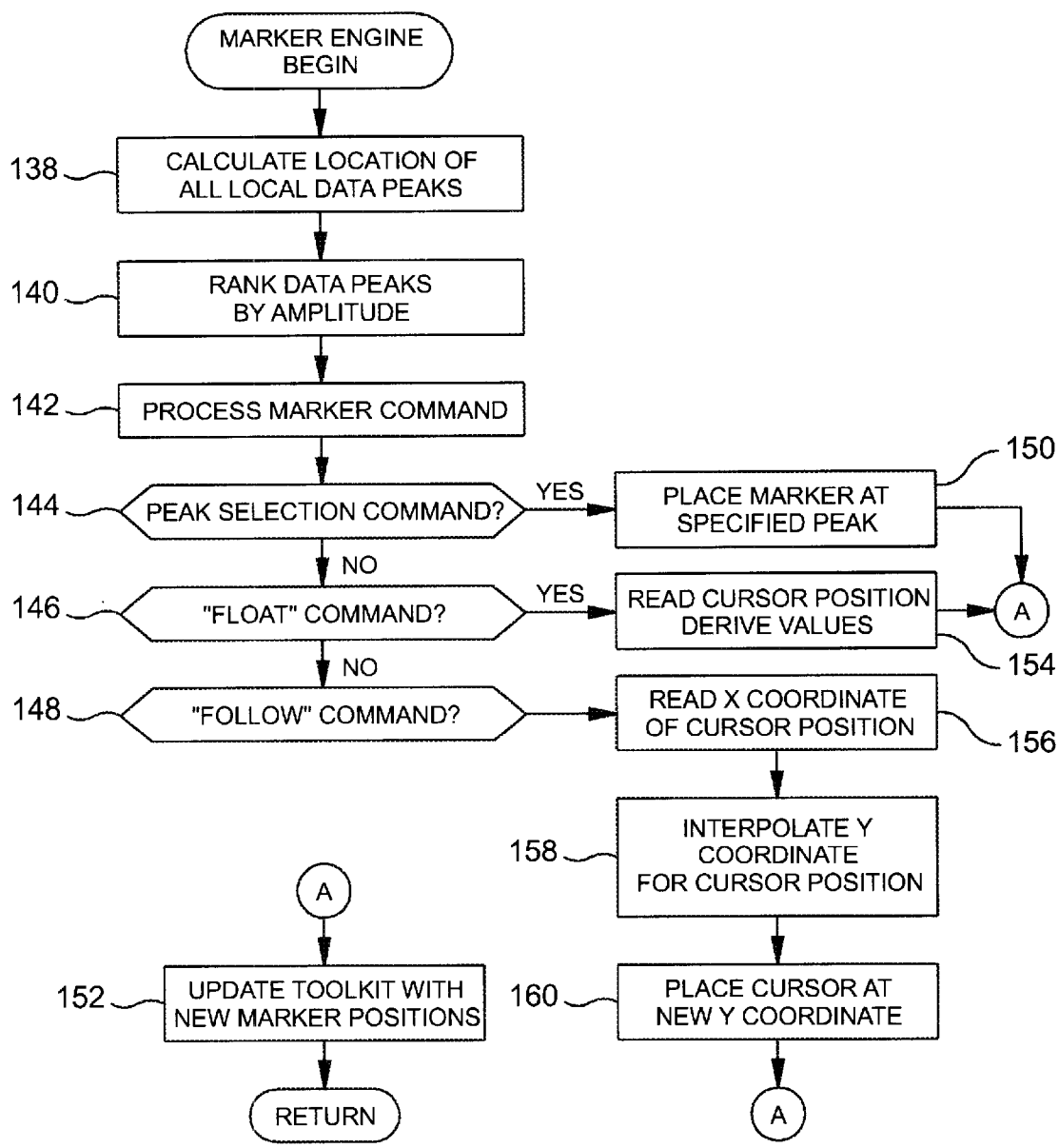
FIG. 17 shows a sample flow chart for operation of the marker toolkit in accordance with the invention.
Figure 18:
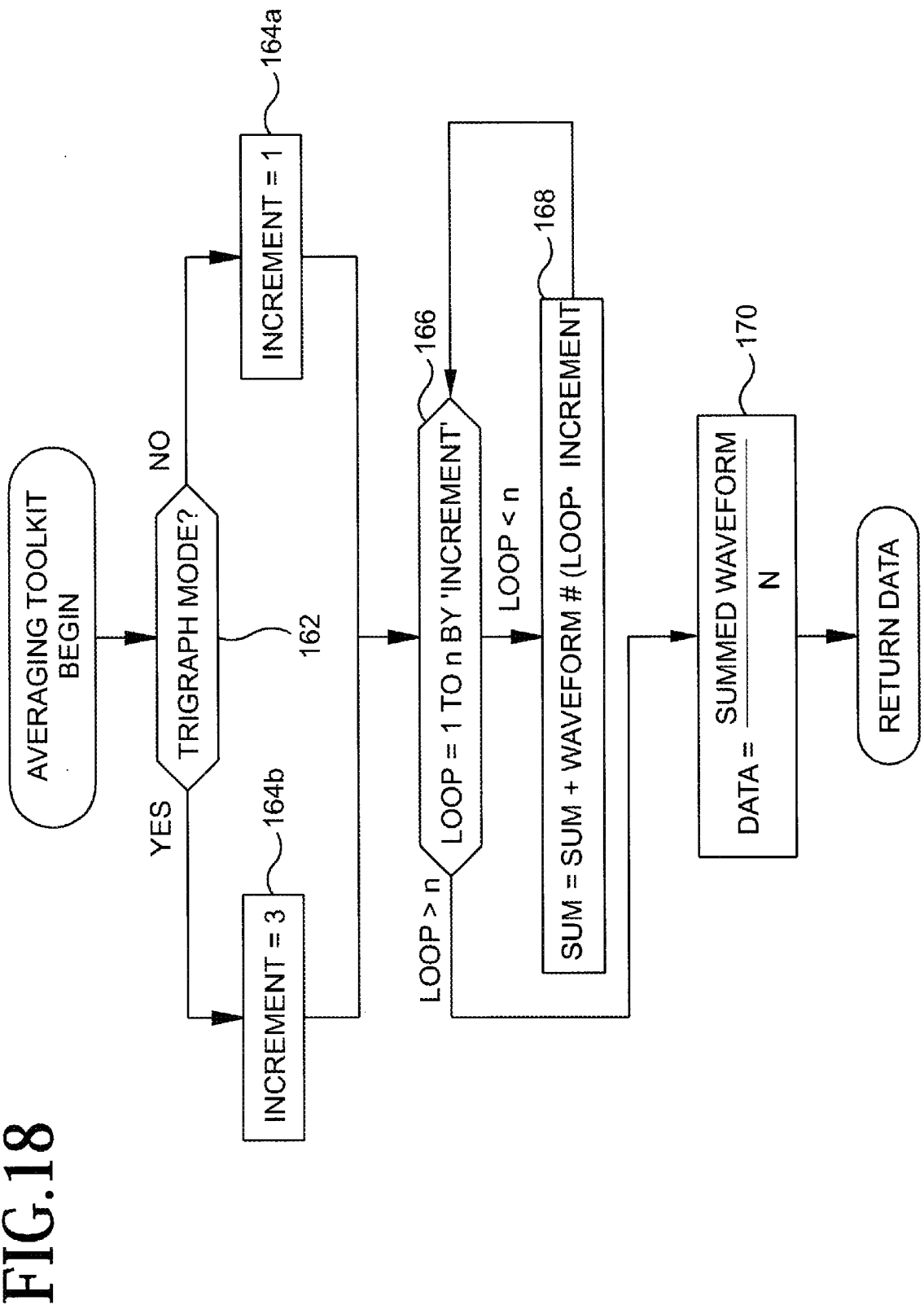
FIG. 18 shows a sample flow chart for operation of the averaging toolkit in accordance with the invention.
Figure 19:
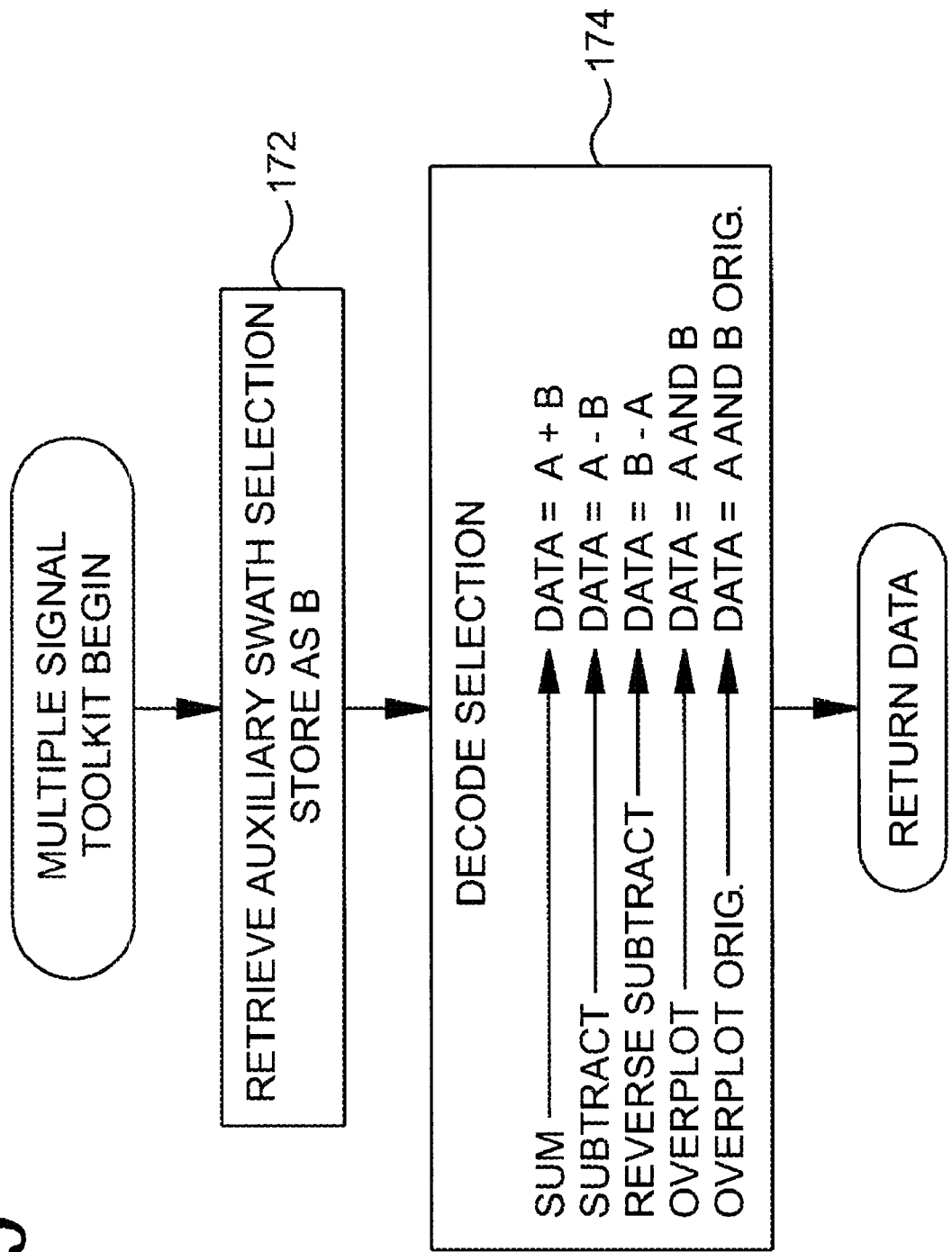
FIG. 19 shows a sample flow chart for. operation of the multiple signal toolkit in accordance with the invention.
Figure 20:
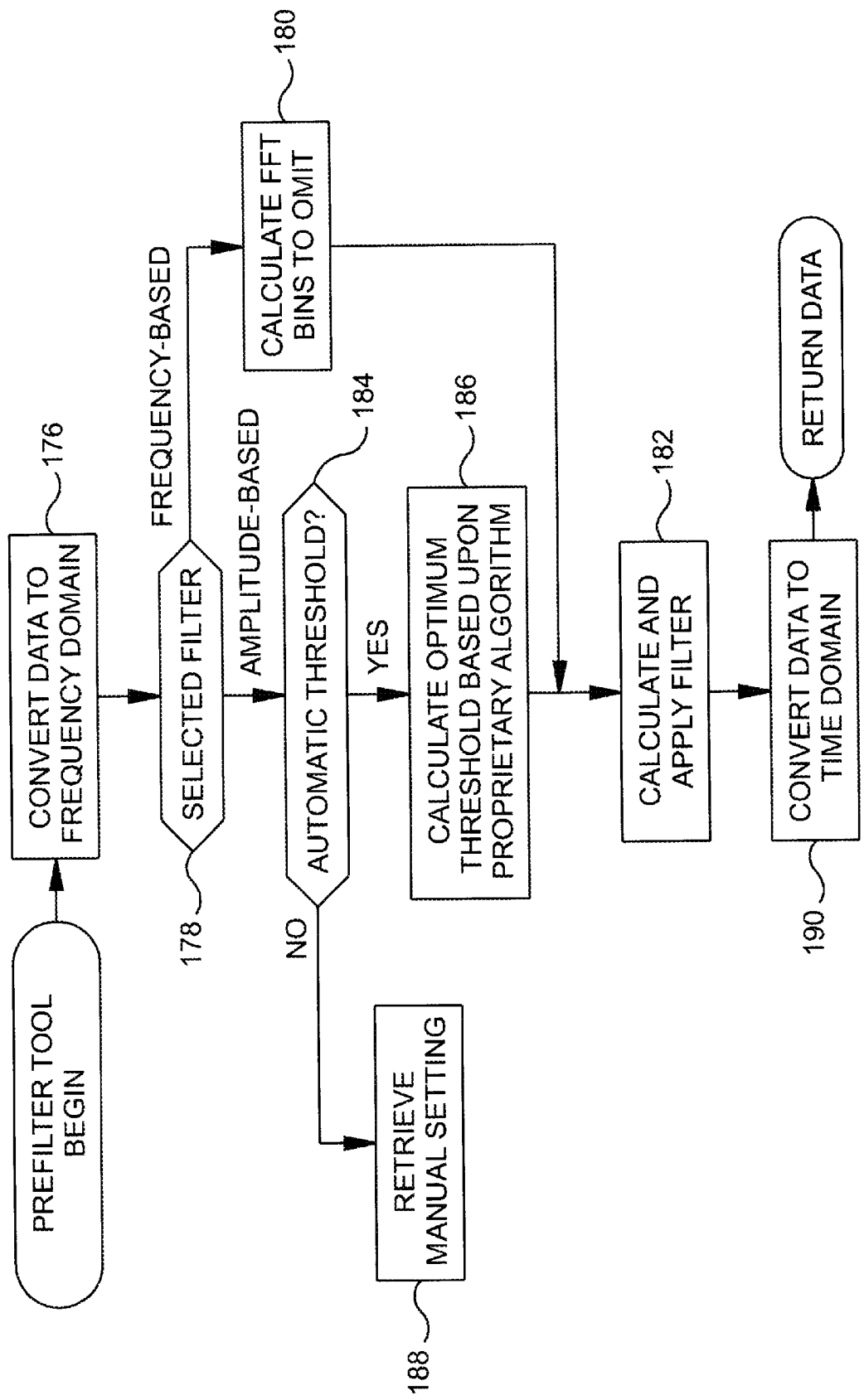
FIG. 20 shows a sample flow chart for operation of the prefilter toolkit in accordance with the invention.
Figure 21:
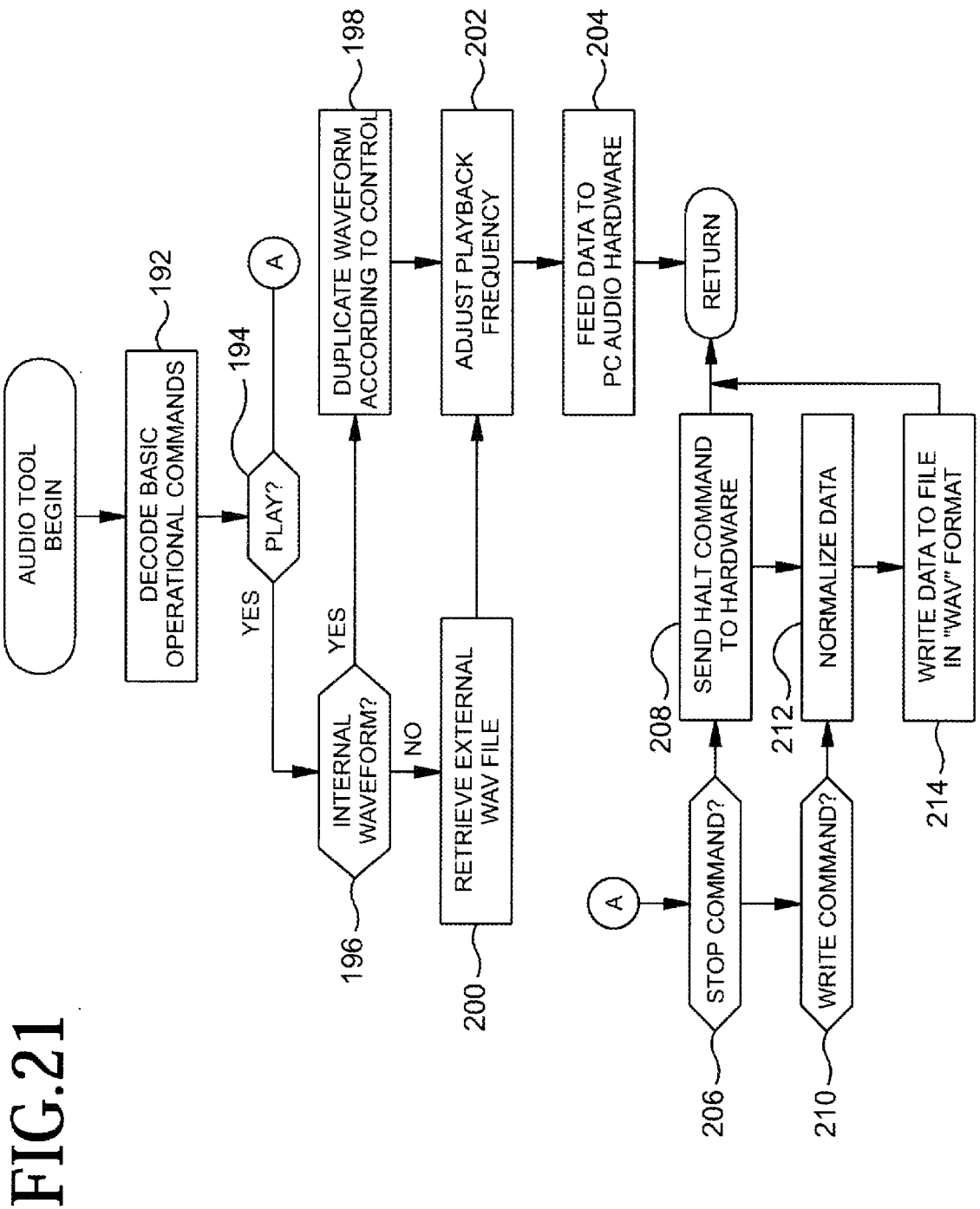
FIG. 21 shows a sample flow chart for operation of the audio toolkit in accordance with the invention.
Figure 22:
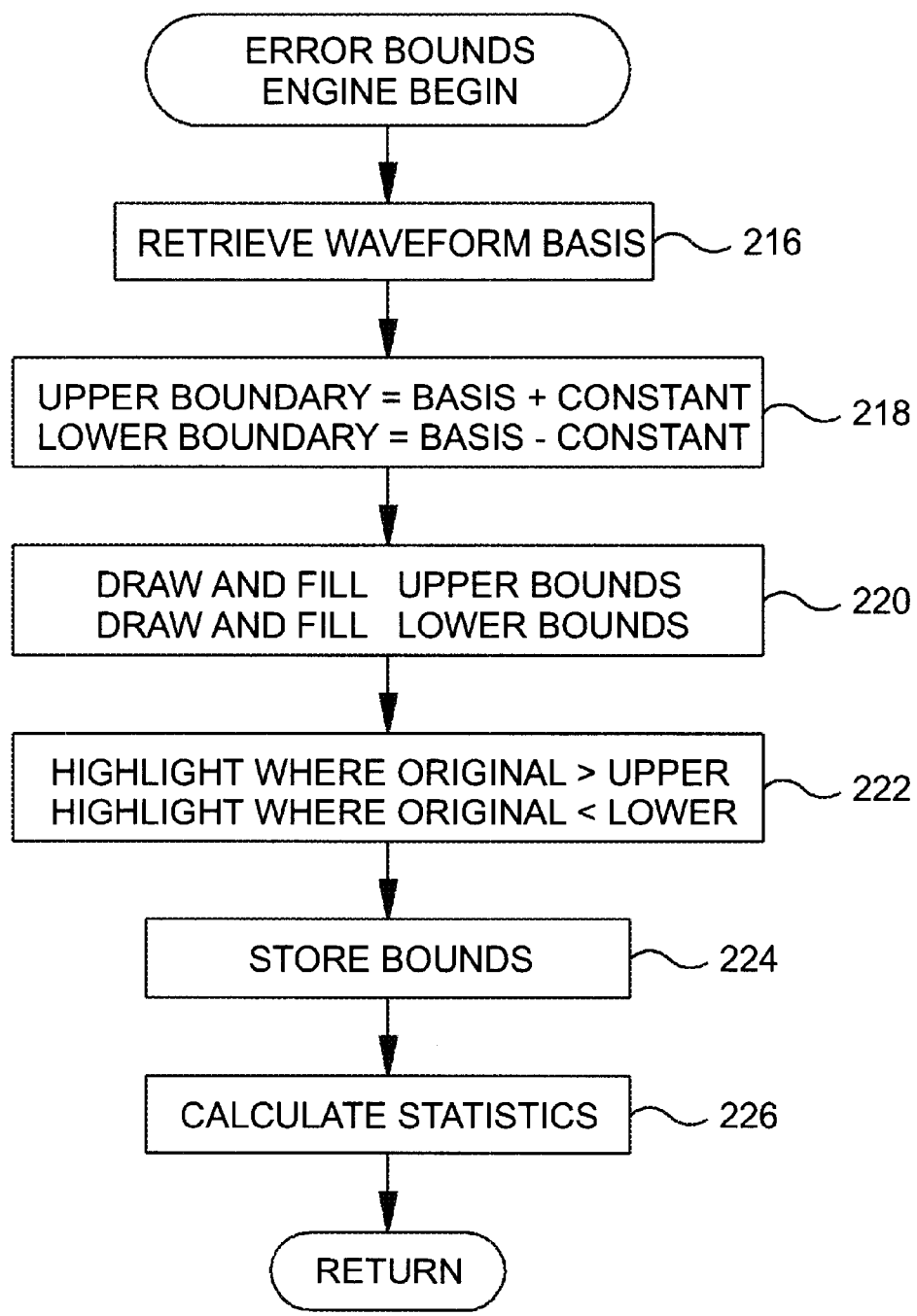
FIG. 22 shows a sample flow chart for operation of the error bounds toolkit in accordance with the invention.
Figure 23:
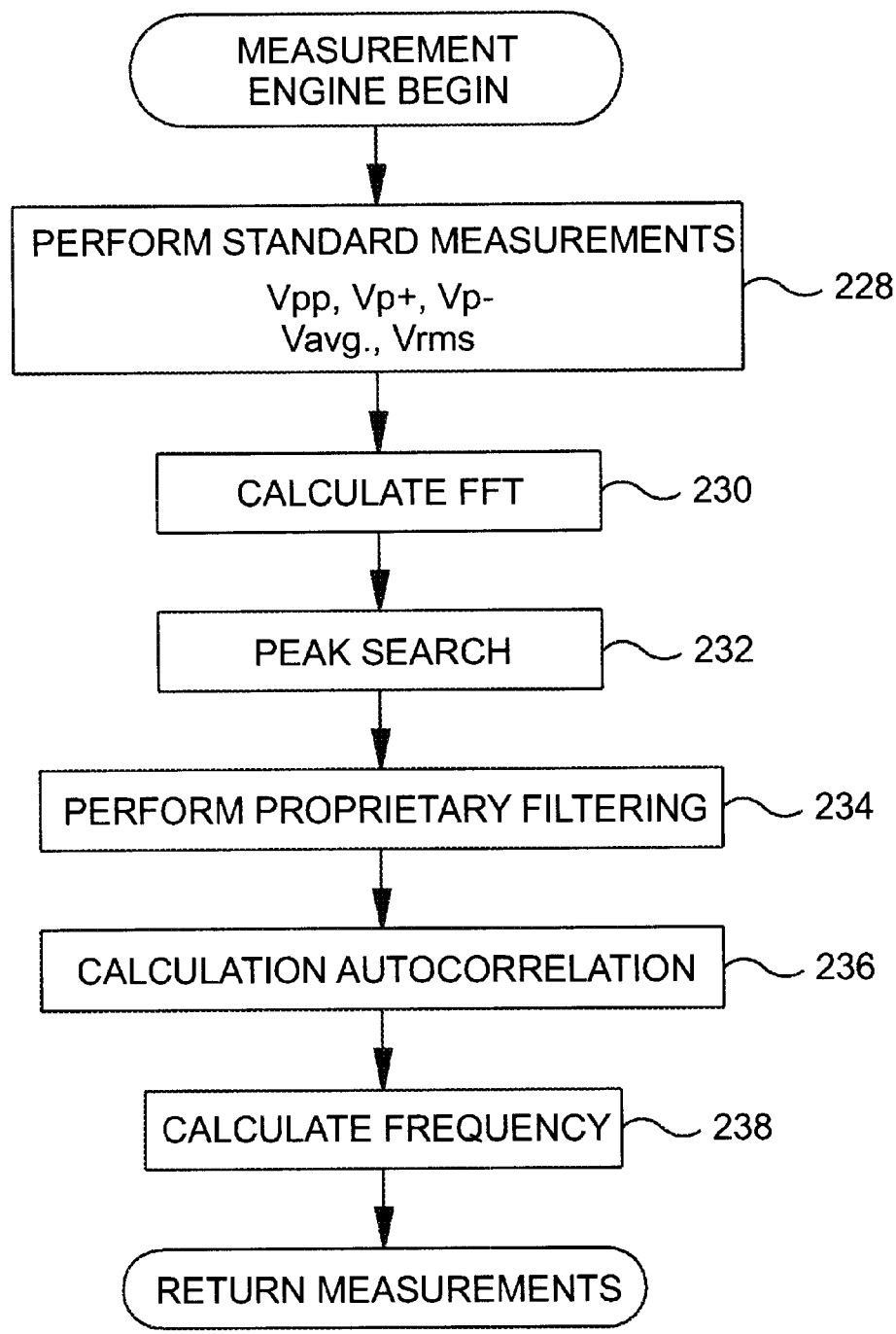
FIG. 23 shows a sample flow chart for operation of the measurement toolkit in accordance with the invention.
Figure 24:
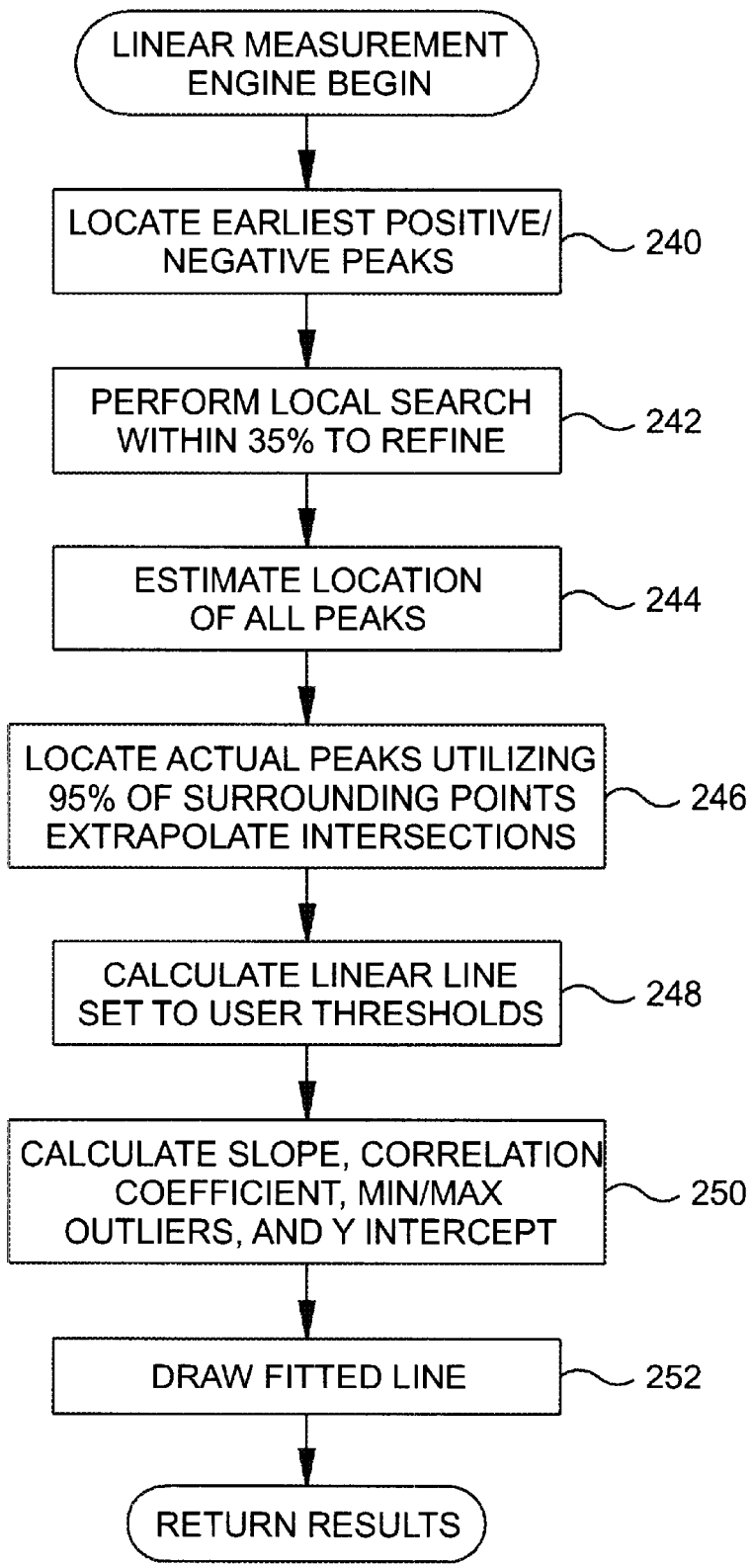
FIG. 24 shows a sample flow chart for operation of the linear measurement toolkit in accordance with the invention.
Figure 25:
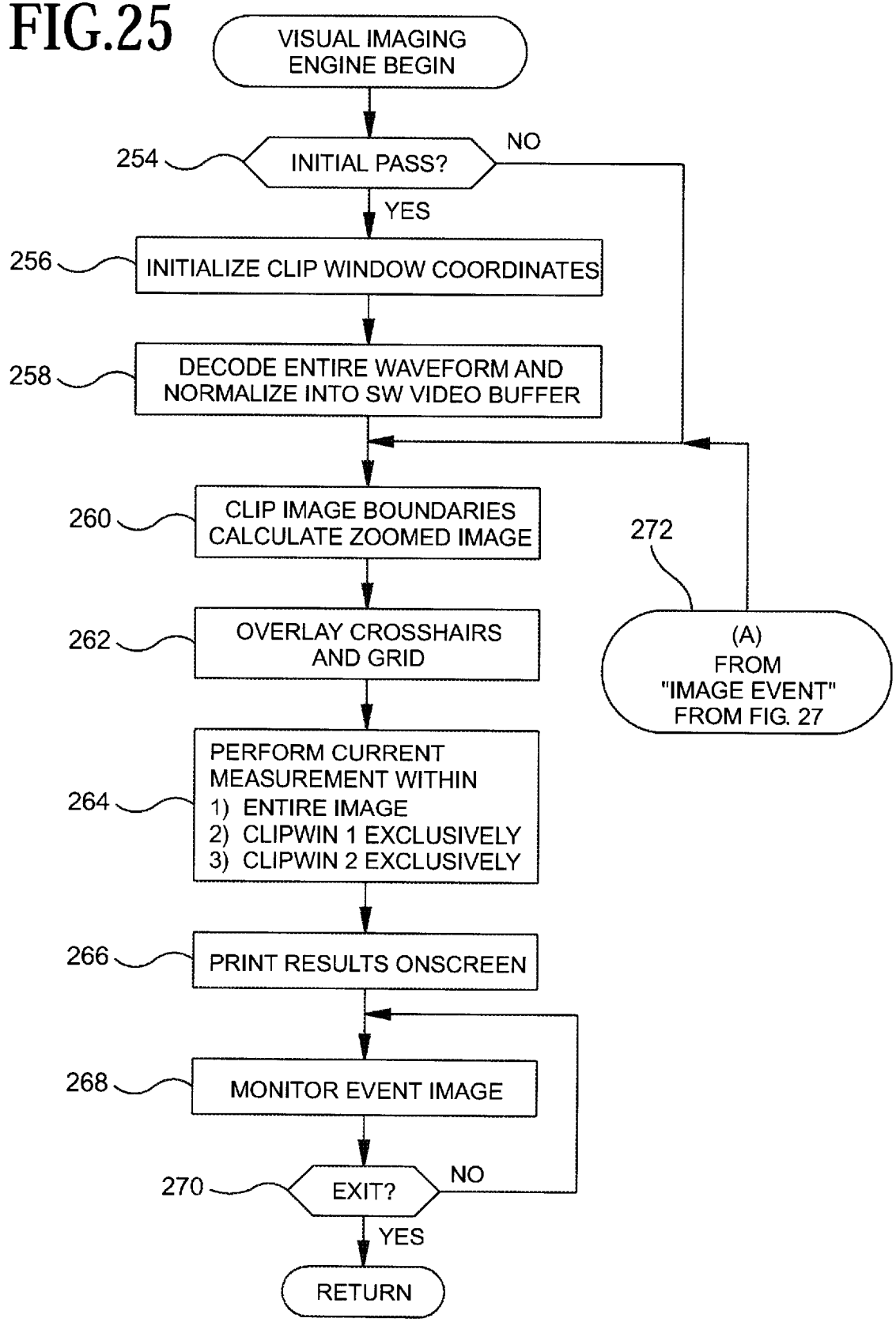
FIG. 25 shows a sample flow chart for operation of the visual imaging toolkit in accordance with the invention.

Referring now to FIG. 15 and the operation of the CEH 24, the type of event is decoded at 124 by one of the decoding structures present in the CEH 24 (see the discussion above regarding the decoding structures). Decoding typically entails recognition and parsing of the command. For example, the command might be to adjust a control within a toolkit. Thus, it is determined whether the command relates to the plot type (126*a*), the configuration (126*b*), a window (126*c*), a marker (126*d*), an averaging function (126*e*), a prefilter (126*f*), the manipulation of multiple signals (126*g*), an audio-related function (126*h*), a desire to set or adjust error bounds (126*i*), a measurement (126*j*), a linear measurement (126*k*), a visual imaging-related function (126*l*), another type of miscellaneous event (126*m*). Some of the commands once decoded can be operated on within the CEH 24. For example, if the command relates to the plot type, i.e., the adjustment of a parameter, the parameter is adjusted at 128*a* and then the data visualization engine (DVE) 28 is called at 130 to perform its functions. Similarly, if the command relates to the configuration, the parameter is adjusted at 128*b* and the DVE 128 is called at 130, or if a miscellaneous command is decoded, a parameter may be modified as per the command at 128*m*.

Figure 7:
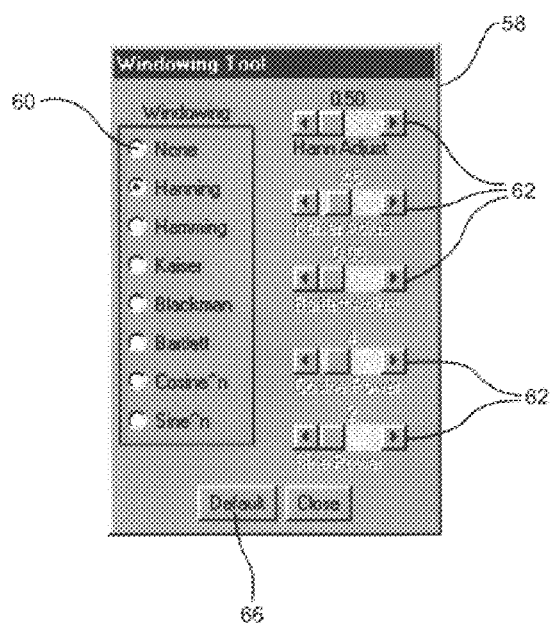
Figure 10:
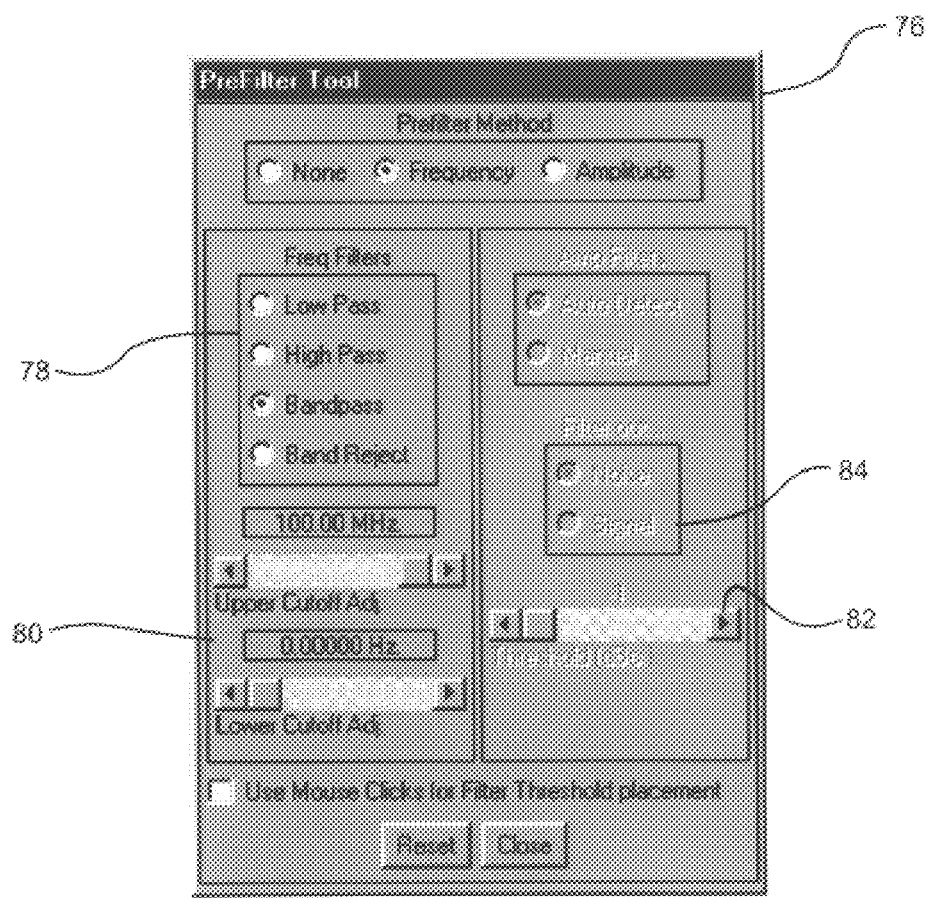

If the command relates to the windows, the windowing engine or toolkit 58 is called at 128*c*, i.e., a subroutine. Operation of the windowing engine 58 is shown schematically in FIG. 16. As noted above, the windowing engine 58 enables various filters or transformations to be applied to the frequency domain plots to, e.g., help eliminate FFT artifacts. These filters include Hanning 132*a*, Hamming 132*b*, Kaiser 132*c*, Blackman 132*d*, Bartlett 132*e*, Cosine-raised-to-the-Nth 132*f* and Sine-raised-to-the-Nth 132*g*. The selection is decoded at 131. If the selection is for the application of a Hanning filter, the Hanning alpha is retrieved at 134*a*. If the selection is for the application of a Kaiser filter, the Kaiser alpha is retrieved at 134*c*. If the selection is for the application of a Bartlett filter, the Bartlett alpha is retrieved at 134*e*. If the selection is for the application of a Cosine-to-the-Nth filter, the Nth factor is retrieved at 134*f*. If the selection is for the application of a Sine-to-the-Nth filter, the Nth factor is retrieved at 134*g*. The alphas and Nth factors can all be set using the adjustment controls 62 as shown in FIG. 7. Thereafter, the requested window relative to the data length is computed at 136 and the DVE 28 is called at 130.

Figure 11:
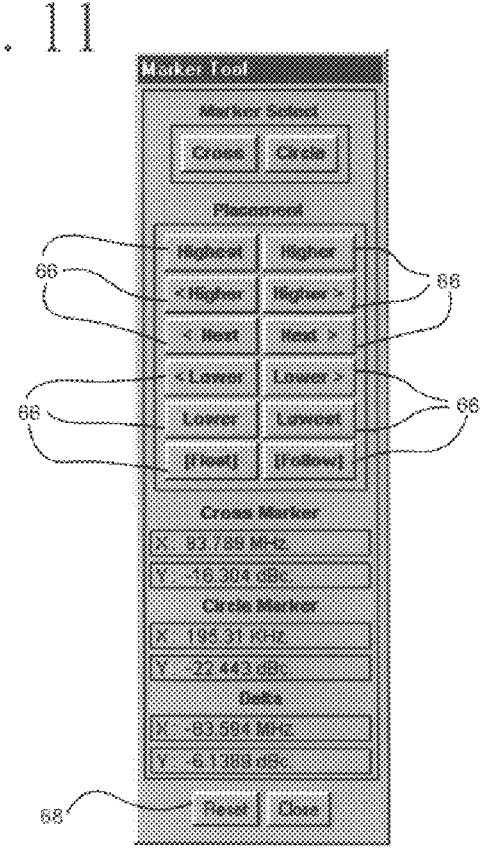
Figure 12:
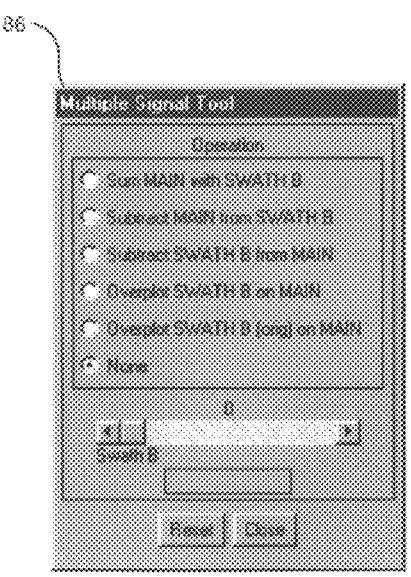

If the command relates to the markers, the marker engine or toolkit is called at 128*d*, i.e., a subroutine. Operation of the marker toolkit is shown schematically in FIG. 17 and the window of the marker toolkit is shown in FIG. 11. As noted above, the marker toolkit enables visual markers to be placed on plotted data. The first step in the use of the marker engine is to calculate the location of all local data peaks 138. The data peaks are ranked by amplitude at 140 and the marker command is processed at 142. A determination is made whether the command is for the selection of the peak 144, a "float" command 146 or a "follow" command 148. If a peak selection command, a marker is placed at the specified peak at 150 and the toolkit is updated with the new marker positions at 152. If the command is a float command (whatever the current cursor position is), the cursor position is read and values are derived at 154 and the toolkit is updated with the new marker positions. If the command is a follow command, the X coordinate of the cursor position is read at 156. The Y coordinate is extrapolated for the cursor position at 158 and the cursor is placed at the new Y coordinate at 160. The toolkit is then updated with the new marker positions at 152 and then returns to call the DVE 28 at 130.

If the command relates to the use of an averaging function, the averaging engine or toolkit is called at 128*e*. Operation of the averaging toolkit is shown schematically in FIG. 18. As noted above, the averaging toolkit, also referred to above as the averaging/persistence toolkit, will provide averaging of future swathes with the current swaths and enable plotting of the same, i.e., on the same window if the TriGraph™ mode is selected. The first step in the use of the averaging toolkit is to determine whether the TriGraph™ mode is being used at 162. If not, the increment is set at 1 at 164*a*, but if so, the increment is set at 3 at 164*b*. At 166, the loop is set from 1 to n by increment. If the loop is less than or equal to n, a new sum is calculated as the sum of the old sum plus the waveform times the loop increment at 168. Once "n" loops have been reached, the data is calculated as the summed waveform over "n" at 170. This data is then saved for subsequent use and the DVE 28 is called at 130.

If the command relates to the use of multiple signals, the multiple signal engine or toolkit 86 is called at 128g. Operation of the multiple signal toolkit is shown schematically in FIG. 19 and as it appears in a window in FIG. 12. As noted above, the multiple signal toolkit 86 allows swath addition, subtraction and overplotting to be performed on the current set of axes. The first step in the use of multiple signal toolkit 86 is to retrieve the auxiliary swath selection store as B at 172. The command selection is decoded at 174 and the data is set in accordance with the command as shown at 174. If the command is decoded as swath addition, the swath B is added to the current swath and the combined waveform is stored as data for subsequent use and the DVE 28 is called at 130.

If the command relates to the use of prefilter tools, the prefilter engine or toolkit 76 is called at 128f. Operation of the prefilter toolkit is shown schematically in FIG. 20 and as it appears in a window in FIG. 10. As noted above, the prefilter toolkit 76 allows frequency domain filtering to be performed on data swathes. The first step in the use of prefilter toolkit 76 is to convert the data to frequency domain at 176. Then, a determination is made at 178 as to whether the filter is frequency based or amplitude based. If frequency based, the FFT bins to omit are calculated at 180 and then the filter is calculated and applied at 182. If amplitude based, a determination is made as to whether there is an automatic threshold at 184. If not, manual setting are retrieved at 188. If yes, the optimum threshold is calculated based upon an algorithm at 186 and then the filter is calculated and applied. The algorithm may be a commercially available algorithm or an algorithm able to be generated by one of ordinary skill in the art to which this invention pertains. The algorithm may also be an algorithm proprietary to the current assignee herein. After application of the filter (or prefilter), the data is converted to the time domain at 190 and stored as data for subsequent use and the DVE 28 is called at 130.

The prefilter tools can be applied to any; type of signal, whether a normal electrical signal, a digitized video signal or a digitized audio signal. For use with audio signals, the prefilters can be used to remove undesired frequencies and background noise.

If the command relates to the use of audio tools, the audio toolkit is called at 128h. Operation of the audio toolkit is shown schematically in FIG. 21 and is described above. The first step in the use of the audio toolkit is to decode the basic operational commands at 192. A determination is made as to whether the audio signal is to be played at 194 and if so, a determination is made as to whether there is an internal waveform at 196. If not, the waveform is duplicated according to the control at 198 and the playback frequency is adjusted at 202. If not, an external "wav"-type file is retrieved at 200 and then the playback frequency is adjusted at 202. Data is then fed to the host computer's audio hardware at 204, e.g., the sound card and speakers. The DVE is then accessed at 130. If the audio signal is not to be played, it is determined whether a stop command has been given at 206 and if so, a halt command is sent to the hardware at 208. If a stop command has not been given and a write command has been given at 210, the data is normalized at 212 and the data is written to a file in "wav" format. The DVE 28 is then accessed at 130.

If the command relates to the use of error bounds tools, the error bounds toolkit is called at 128i. Operation of the error bounds toolkit is shown schematically in FIG. 22 and is described above. The error bounds toolkit enables sets of upper and lower bounds templates to be created and to which the present waveforms are compared to. The first step in the use of the error bounds toolkit is to retrieve the waveform basis information at 216. The upper boundary is set as the basis plus a constant whereas the lower boundary is set as the basis less the constant at 218. The upper and lower bounds are then drawn and filled at 220. The portions of the waveforms which are greater than the upper bounds or lower than the lower bounds are highlighted at 222. The bounds are stored at 224 and statistics relating to the presence of the errors, e.g., the duration of the waveform out of bounds, may be calculated at 226. The DVE 28 is then accessed at 130.

If the command relates to the use of measurements, the measurement engine or toolkit is called at 128j. Operation of the measurement toolkit is shown schematically in FIG. 23. As described above, the measurement toolkit enables the automatic calculation and display of time domain and frequency domain measurements. The first step in the use of the measurement toolkit is to perform standard measurements such as the average voltage, rms voltage, etc. at 228. The FFT is calculated at 230, a search is made for the peak at 232 and then a filtering is performed at 234. The filtering may be performed by any known filtering technique or a proprietary filtering technique of the current assignee. The autocorrelation is calculated at 236 and the frequency at 238. The measurements thus obtained are stored and the DVE 28 is then accessed at 130.

If the command relates to the use of linearity measurements, the linear measurement engine or toolkit is called at 128k. Operation of the linear measurement toolkit is shown schematically in FIG. 24. As described above the linear measurement toolkit enables the start and end of data swath slope segments to be automatically detected. The first step in the use of the linear measurement toolkit is to locate the earliest positive and negative peaks at 240. At 242, a local search is performed within about 35% of the determined location to refine the location of the earliest peaks. The location of all peaks is then estimated at 244 and the location of the actual peaks is obtained at 246 utilizing about 95% of the surrounding points. The intersections are also extrapolated. The linear line is calculated to user thresholds at 248. The slope, correlation coefficient, minimum/maximum outliners and Y intercept and calculated at 250 and then a fitted line is drawn at 252. The DVE 28 is then accessed at 130.

If the command relates to the use of visual imaging tools, the visual imaging engine or toolkit 88 is called at 128l. Operation of the visual imaging toolkit is shown schematically in FIG. 25. As described above, the visual imaging toolkit 88, shown in FIG. 13, enables a wide range of visual enhancement functions and measurements facilitating the automated analysis of digitized video signals. One particular feature is the window-within-a-window or clipboard feature. The first step in the use of the visual imaging toolkit 88 is to determine whether there is an initial pass at 254. If yes, the clipwindow coordinates are initialized at 256 and the entire waveform is decoded and normalized into a video buffer at 258. The image boundaries are clipped and the zoomed image is calculated at 260. If there is not an initial pass, the processes proceeds directly to the clipping of the image boundaries and calculation of the zoomed image at 260. Thereafter, the crosshairs and grid are overlaid at 262 and the current measurement is performed within the entire image or a single one of the clipwindows at 264. The results may be shown onscreen at 266. The image event is monitored at 268 and a determination made at 270 when to exit at 270 and return to access the DVE 28.

Figure 26:
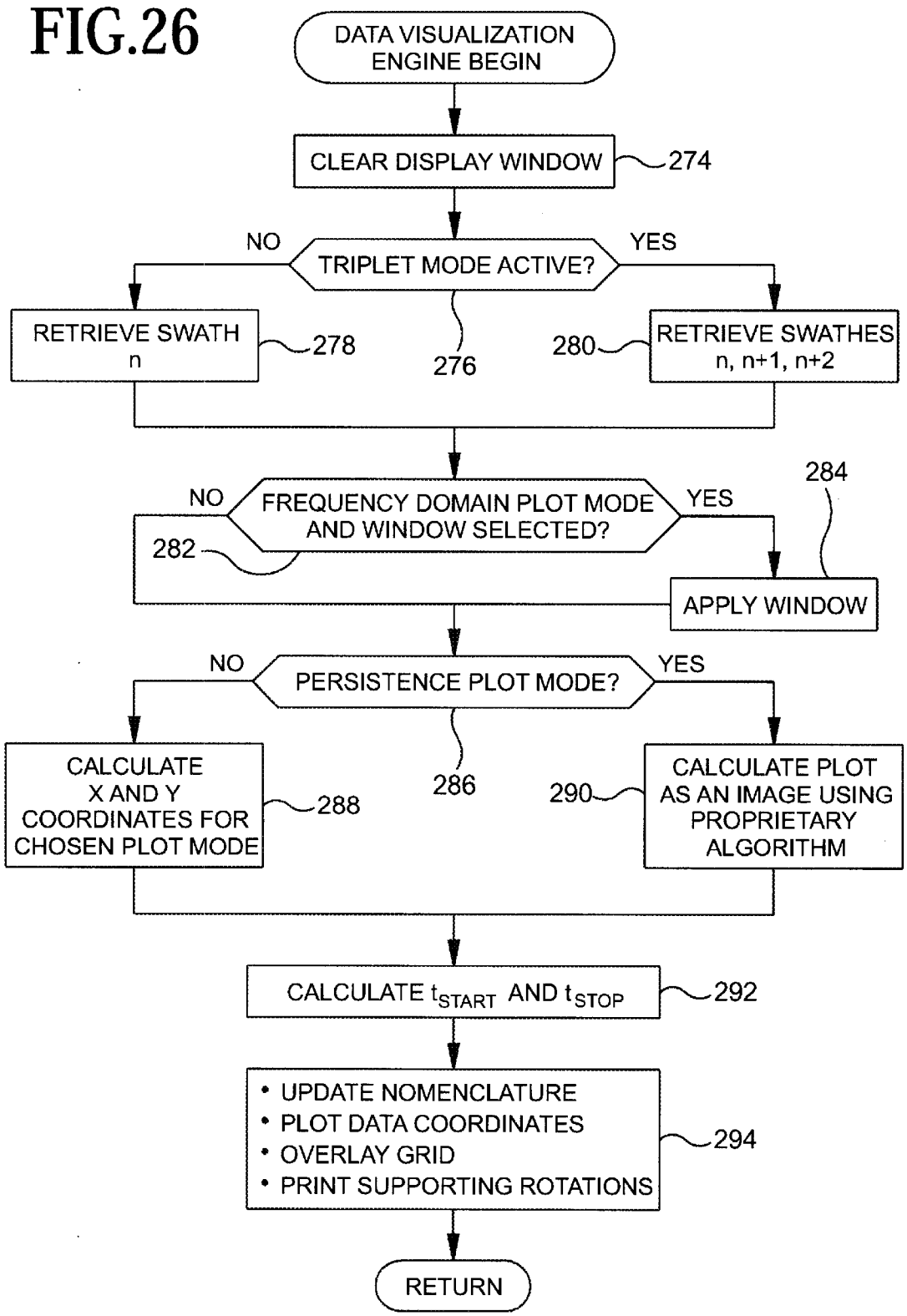
FIG. 26 shows a sample flow chart for operation of the data visualization engine in accordance with the invention.

The operation of the data visualization engine (DVE) 28 is shown schematically in FIG. 26. The first step is to clear the display window at 74. A determination is made t 276 as to whether the triplet mode is active. If not, only swath n is retrieved at 278. If triplet mode is active, i.e., three swaths are displayed, then swaths n, n+1 and n+2 are retrieved at 280. After the appropriate swath or swathes are retrieved, a determination is made at 282 as to whether the frequency domain plot mode and window are selected. If yes, the window is applied at 284. Thereafter, a determination is made at 286 as !to whether the persistence plot mode is active. If not, the X and Y coordinates for the selected pilot mode are calculated at 288. If the persistence plot mode is active, the plot is calculated as an image using an algorithm at 290. The algorithm may be an algorithm available to one skilled in the art or readily createable by one skilled in the art based on the desired objective, or a proprietary algorithm of the current assignee. The start and end of the waveform to be displayed on the monitor 32 are calculated at 292 and then the image is updated with additional nomenclature detailing control settings at 294. For example, the nomenclature can be updated, the data coordinates plotted, a grid overlaid and supporting rotations printed. The image displayed on the monitor 32 may also be forwarded to a printer for creation of a hard copy or to a file storage device for storage. Thereafter, the process is continued upon receipt of the next command either from the GUI input or the command log (refer to FIG. 14).

Figure 27:
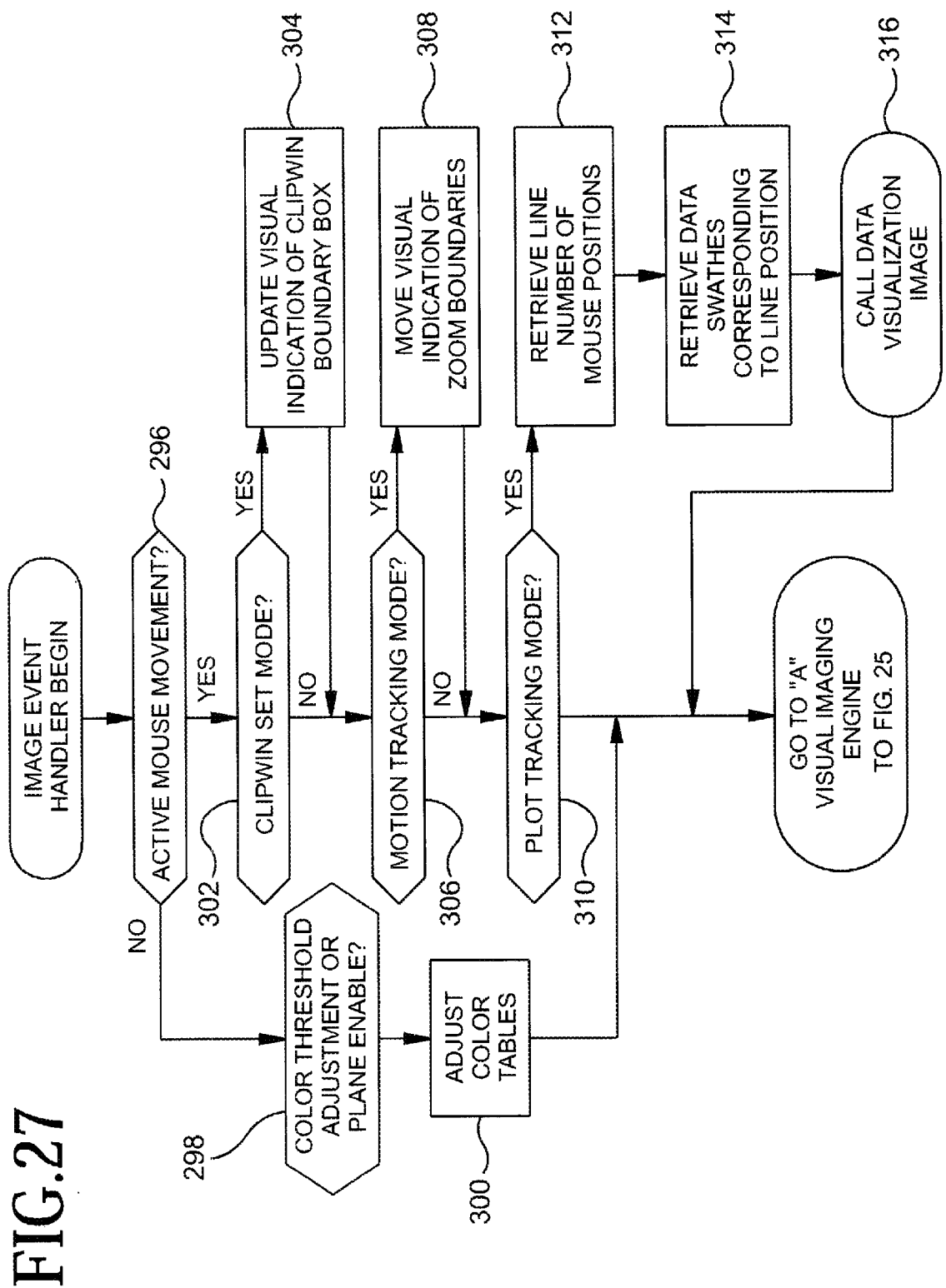
FIG. 27 shows a sample flow chart for operation of the image event handler in accordance with the invention.

FIG. 27 shows the operation of the image event handler in accordance with the invention. The image event handler is contained substantially within the control event handler (CEH) 24 as shown in FIG. 1. Technically however, the determination of whether there is movement of the mouse (at 296) is part of the graphical user interface (GUI) 20. The function of the image event handler is to accept input relating only to the visual imaging toolkit 88 and pre-process the input before passing control to the visual imaging toolkit 88. More particularly, if active mouse movement is not detected at 296, a determination is made at 298 whether the color threshold adjustment or plane is enabled and the color tables are adjusted at 300 if necessary. The process then continues with the clipping of the image boundaries and calculation of the zoomed image at 260 in FIG. 25. If there is active mouse movement, a determination is made whether the system is in the "clipwin set mode" at 302. If so, the visual indication of the clipwin boundary box is updated at 304. A determination is then made whether the system is in the "motion tracking mode" at 306. If so, the visual indication of the zoom boundaries is moved at 308. A determination is then made whether the system is in the "plot tracking mode" at 310. If so, the line number of the mouse position is retrieved at 312, data swathes corresponding to the line position are retrieved at 314 and the data visualization image engine is called at 316 (refer to FIG. 26). Thereafter, the process continues with the clipping of the image boundaries and calculation of the zoomed image at 260 in FIG. 25.

In use, the VSA operates depending on the type of test waveform being analyzed. If the test waveform is a digital signal, it can be plotted and displayed in a similar manner as on an oscilloscope (see, e.g., FIGS. 3–5). The signal can be adjusted using the tools described above to the extent operable on a digital signal. If the test waveform is an audio signal, the audio signal is first digitized by the test station digitizer 12 (assuming it has not been previously digitized and stored in a binary file in mass storage device 30) and then can be analyzed and adjusted using the host computer's sound card and speakers. The audio signal toolkit enables the audio signal to be played on the sound card and speakers. Adjustment of the audio signal can be obtained using some of the same toolkits which are operative for the digital signal, e.g., the prefilter toolkit which can eliminate undesired audio frequencies and background noise. If the test waveform is a video signal, the video signal is first digitized by the test station digitizer 12 (assuming it has not been previously digitized and stored in a binary file in mass storage device 30) and then reconstructed on the screen and presented as the original image (see, e.g., FIG. 13). This is done using, e.g., the visual imaging toolkit. Portions of the image can be clipped and moved to smaller windows while various tools can be applied to the video image, such as zoom, invert and color manipulation.

As such, using a single equipment package with the software set forth in the Appendix, it is possible to handle electrical, video and audio signals each in its corresponding environment.

Having thus described a few particular embodiments of the invention, various alterations, modifications, and improvements will readily occur to those skilled in the art. For instance, the invention can be adapted to other operating system environments with minor modifications to the interface or control appearances. Such alterations, modifications and improvements as are made obvious by this disclosure are intended to be part of this description though not expressly stated herein, and are intended to be within the spirit and scope of the invention. Accordingly, the foregoing description is by way of example only, and is not limiting. The invention is limited only as defined in the claims and equivalents thereto. In particular, the illustrated flow charts do not include all of the possible processes for analysis and manipulation of waveforms as described in the specification. Rather, the flow charts s how the main steps for each component and toolkit in the invention.

What is claimed is:

1. A method for analyzing and testing a waveform selected from a group of an electrical signal, a digitized audio signal and a digitized video signal, comprising the steps of:

providing a single equipment package including a computer having a sound card, at least one speaker, a screen and means for processing a command log, when the waveform is an electrical signal plotting and displaying a swath of the electrical signal on the screen, when the waveform is a digitized audio signal, directing the audio signal to the sound card and speaker, when the waveform is a digitized video signal, reconstructing the video signal on the screen, providing a plurality of software tools operative on the electrical signal, the audio signal and the video signal to effect changes in the electrical signal, the audio signal and the video signal, when the waveform is the electrical signal, displaying the changed electrical signal on the screen, when the waveform is the audio signal, directing the changed audio signal to the sound card and speaker, when the waveform is the video signal, displaying the changed the video signal on the screen, generating the command log through programming to perform desired control of the tools, and operatively accessing the command log to obtain the desired control commands for the tools such that automatic adjustment of the waveform via the; tools is accomplished.

2. The method of claim 1, wherein the equipment further includes a user interface, further comprising the step of:

controlling the tools via the user interface to enable manual adjustment of the waveform.

3. The method of claim 1, further comprising the steps of:
providing a test station digitizer for digitizing audio and video signals, and
inputting audio signals and video signals to be analyzed into the test station digitizer to be digitized prior to analysis.

4. The method of claim 1, further rising the steps of:
digitizing any audio signals and video signals to be analyzed, and
storing the digitized audio signals and ;digitized video signals in a binary file.

5. The method of claim 1, further comprising the step of:
encoding additional information about the waveform in combination with the waveform.

6. The method of claim 1, wherein when the waveform is the electrical signal, further comprising the step of:
plotting and displaying a plurality of !swathes of the electrical signal on the screen, each swath in a discrete portion of the screen.

7. The method of claim 1, wherein the step of providing a plurality of tools includes the step of providing a plotting tools including options selected from a group consisting of time domain plotting, FFT results, spectrum/magnitude plotting, autocorrelation plotting and cross correlation plotting.

8. The method of claim 1, wherein the step of providing a plurality of tools includes the steps of providing a configuration adjustment tool including options selected from a group consisting of orientation adjustment of a graph of the waveform, color adjustments, test adjustments, highlighting and axis scale lock adjustments.

9. The method of claim 1, wherein the step of providing a plurality of tools includes the step of providing a signal manipulation tool including options selected from a group consisting of filters, a ranking of peaks in the at least one test signal by amplitude, averaging, fixed voltage removal, and addition and subtraction of an additional test signal to the at least one test signal.

10. The method of claim 1, wherein when the waveform is an electrical signal or a video signal, further comprising the step of:
limiting operability of the tools to only a selected portion of the electrical signal or video signal on the screen.

11. The method of claim 1, wherein when the waveform is an electrical signal or video signal, further comprising the steps of:
selecting a portion of the electrical signal or video signal, and
displaying the selected portion in a different area of the screen.

12. The method of claim 11, wherein the electrical signal or video signal is displayed on a primary image window and the selected portion is displayed on an auxiliary window on the same screen as the primary image window, further comprising the step of:
linking the auxiliary window to the primary image window.

13. The method of claim 12, further comprising the step of:
limiting operability of the tools to only the selected portion of the electrical signal or video signal on the screen.

14. The method of claim 1, wherein the step of providing a plurality of tools includes the steps of:
providing a library of stored subroutines in the equipment to perform the functions of the tools such that the electrical signal, the video signal and the audio signal are able to be manipulated by running the subroutines.

15. The method of claim 1, wherein the waveform is an electrical signal or a video signal, further comprising the steps of:
displaying a portion of the electrical signal or video signal separate from the display of the entire electrical signal or video signal,
applying at least one signal modification technique to the portion of the electrical signal or video signal, and
linking the display of the entire test signal to the display of the portion of the electrical or video signal such that the application of the at least one signal modification technique to the portion of the electrical or video signal is reflected in the display of the entire electrical signal or video signal.

16. The method of claim 1, wherein the waveform is an electrical signal or a video signal, further comprising the steps of:
displaying a portion of the electrical signal or video signal separate from the display of the entire electrical signal or video signal,
applying at least one signal modification technique to the entire electrical signal or video signal, and
linking the display of the entire electrical signal or video signal to the display of the portion of the electrical signal or video signal such that the application of the at least one signal modification technique to the entire electrical signal or video signal is reflected in the display of the portion of the electrical signal or video signal.

17. The method of claim 1, wherein the waveform is an electrical signal, wherein the step of providing a plurality of tools includes the step of providing an error bounds tool, the error bounds tools including the step of:
defining upper and lower error bounds for the electrical signal on the screen.

18. The method of claim 17, wherein the error bounds tool further comprises the step of:
visually differentiating the upper and lower bound regions.

19. The method of claim 1, wherein the waveform is an audio signal, wherein the step of providing a plurality of tools includes the step of providing a prefilter tool capable of filter undesired audio frequencies and background noise.

20. The method of claim 11, wherein a picture image reconstructed from the electrical signal or video signal is displayed on a primary image window and the selected portion of the electrical signal or video signal is reconstructed and displayed on an auxiliary window on the same screen as the primary image window.

21. A method for analyzing and testing a waveform selected from a group of an electrical signal, a digitized audio signal and a digitized video signal, comprising the steps of:
providing a single equipment package including a computer having a sound card, at least one speaker and a screen,
when the waveform is an electrical signal, plotting and displaying a swath of the electrical signal on the screen,
when the waveform is a digitized audio signal, directing the audio signal to the sound card and speaker,
when the waveform is a digitized video signal, reconstructing the video signal on the screen, providing a plurality of software tools operative on the electrical signal, the audio signal and the video signal to effect changes in the electrical signal, the audio signal and the video signal, when the waveform is the electrical signal displaying the changed electrical signal on the screen, when the waveform is the audio signal, directing the changed audio signal to the sound card and speaker, and when the waveform is the video signal, displaying the changed the video signal on the screen, when the waveform is an electrical signal, the step of providing a plurality of tools including the step of providing an error bounds tool enabling the defining of upper and lower error bounds for the electrical signal on the screen.

22. The method of claim 21, further comprising the step of constructing the error bounds tool to enable visual differentiation of the upper and lower bound regions.

23. A method for analyzing and testing a waveform selected from a group of an electrical signal, a digitized audio signal and a digitized video signal, comprising the steps of:

providing a single equipment package including a computer having a sound card, at least one speaker and a screen, when the waveform is an electrical signal, plotting and displaying a swath of the electrical signal on the screen, when the waveform is a digitized audio signal, directing the audio signal to the sound card and speaker, when the waveform is a digitized video signal, reconstructing the video signal on the screen, providing a plurality of software tools operative on the electrical signal, the audio signal and the video signal to effect changes in the electrical signal, the audio signal and the video signal, when the waveform is the electrical signal, displaying the changed electrical signal on the screen, when the waveform is the audio signal, directing the changed audio signal to the sound card and speaker, and when the waveform is the video signal, displaying the changed the video signal on the screen, wherein when the waveform is the electrical signal, further comprising the step of:

simultaneously plotting and displaying a plurality of swathes of the electrical signal on the screen in the same form, each swath in a discrete portion of the screen.

24. A method for analyzing and testing a waveform selected from a group of an electrical signal, a digitized audio signal and a digitized video signal, comprising the steps of:

providing a single equipment package including a computer having a sound card, at least one speaker and a screen, when the waveform is an electrical signal, plotting and displaying a swath of the electrical signal on the screen, when the waveform is a digitized audio signal, directing the audio signal to the sound card and speaker, when the waveform is a digitized video signal, reconstructing the video signal on the screen, providing a plurality of software tools operative on the electrical signal, the audio signal and the video signal to effect changes in the electrical signal, the audio signal and the video signal, when the waveform is the electrical signal, displaying the changed electrical signal on the screen, when the waveform is the audio signal, directing the changed audio signal to the sound card and speaker, and when the waveform is the video signal, displaying the changed the video signal on the screen, wherein when the waveform is an electrical signal or video signal, further comprising the steps of:

selecting a portion of the electrical signal or video signal, and displaying the selected portion in a different area of the screen at the same time as the full electrical or video signal is being displayed on the screen.

25. The method of claim 24, wherein the electrical signal or video signal is displayed on a primary image window and the selected portion is displayed on an auxiliary window on the same screen as the primary image window, further comprising the step of:

linking the auxiliary window to the primary image window.

26. The method of claim 25, wherein the selected portion displayed in the auxiliary window is linked to the primary image window such that the selected portion displayed varies upon movement of a screen tool across the primary image window.

27. The method of claim 24, further comprising the step of:

limiting operability of the tools to only the selected portion of the electrical signal or video signal on the screen.

28. The method of claim 23, wherein a picture image reconstructed from the electrical signal or video signal is displayed on a primary image window and the selected portion of the electrical signal or video signal is reconstructed and displayed on an auxiliary window on the same screen as the primary image window.

29. The method of claim 23, wherein a picture image reconstructed from the electrical signal or video signal is displayed on a primary image window and the selected portion of the electrical signal or video signal is reconstructed, magnified and displayed on an auxiliary window on the same screen as the primary image window.

30. A method for analyzing and testing a waveform selected from a group of an electrical signal, a digitized audio signal and a digitized video signal, comprising the steps of:

providing a single equipment package including a computer having a sound card, at least one speaker and a screen, when the waveform is an electrical signal, plotting and displaying a swath of the electrical signal on the screen, when the waveform is a digitized audio signal, directing the audio signal to the sound card and speaker, when the waveform is a digitized video signal, reconstructing the video signal on the screen, providing a plurality of software tools operative on the electrical signal, the audio signal and the video signal to effect changes in the electrical signal, the audio signal and the video signal, when the waveform is the electrical signal, displaying the changed electrical signal on the screen, when the waveform is the audio signal, directing the changed audio signal to the sound card and speaker, and when the waveform is the video signal, displaying the changed the video signal on the screen, wherein the waveform is an electrical signal or a video signal, further comprising the steps of:

displaying a portion of the electrical signal or video signal in the same form as but separate from the display of the entire electrical signal or video signal, applying at least one signal modification technique to the portion of the electrical signal or video signal, and linking the display of the entire test signal to the display of the portion of the electrical or video signal such that the application of the at least one signal modification technique to the portion of the electrical signal or video signal is reflected in the display of the entire electrical signal or video signal.

31. A method for analyzing and testing a waveform selected from a group of an electrical signal, a digitized audio signal and a digitized video signal, comprising the steps of:

providing a single equipment package including a computer having a sound card, at least one speaker and a screen, when the waveform is an electrical signal, plotting and displaying a swath of the electrical signal on the screen, when the waveform is a digitized audio signal, directing the audio signal to the sound card and speaker, when the waveform is a digitized video signal, reconstructing the video signal on the screen, providing a plurality of software tools operative on the electrical signal, the audio signal and the video signal to effect changes in the electrical signal, the audio signal and the video signal, when the waveform is the electrical signal, displaying the changed electrical signal on the screen, when the waveform is the audio signal, directing the changed audio signal to the sound card and speaker, and when the waveform is the video signal, displaying the changed the video signal on the screen, wherein the waveform is an electrical signal or a video signal, further comprising the steps of:

displaying a portion of the electrical signal or video signal in the same form as but separate from the display of the entire electrical signal or video signal, applying at least one signal modification technique to the entire electrical signal or video signal, and linking the display of the entire electrical signal or video signal to the display of the portion of the electrical signal or video signal such that the application of the at least one signal modification technique to the entire electrical signal or video signal is reflected in the display of the portion of the electrical signal or video signal.

* * * * *